(12) United States Patent
Mueck et al.

(10) Patent No.: US 9,973,933 B2
(45) Date of Patent: May 15, 2018

(54) SPECTRUM ACCESS SYSTEM (SAS) CONTROLLER, EVOLVED NODE-B (ENB) AND METHOD FOR ALLOCATION OF SHARED SPECTRUM

(71) Applicant: Intel IP Corporation, Santa Clara, CA (US)

(72) Inventors: Markus Dominik Mueck, Unterhaching (DE); Sabine Roessel, Munich (DE); Biljana Badic, Duesseldorf (DE); Srikathyayani Srikanteswara, Portland, OR (US); Thomas Haustein, Potsdam (DE); Thomas Wirth, Berlin (DE); Bernd Holfeld, Berlin (DE)

(73) Assignee: Intel IP Corporation, Santa Clara, CA (US)

( * ) Notice: Subject to any disclaimer, the term of this patent is extended or adjusted under 35 U.S.C. 154(b) by 142 days.

(21) Appl. No.: 14/757,921

(22) Filed: Dec. 23, 2015

(65) Prior Publication Data
US 2017/0188241 A1 Jun. 29, 2017

(51) Int. Cl.
*H04W 16/10* (2009.01)
*H04W 16/14* (2009.01)
(Continued)

(52) U.S. Cl.
CPC .......... *H04W 16/10* (2013.01); *H04W 16/14* (2013.01); *H04W 72/0453* (2013.01); *H04W 72/082* (2013.01)

(58) Field of Classification Search
CPC ..... H04W 16/00–16/32; H04W 16/14; H04W 16/16; H04W 28/08–28/085;
(Continued)

(56) References Cited

U.S. PATENT DOCUMENTS

| 2010/0317364 A1 | 12/2010 | Zhang et al. |
| 2014/0011509 A1 | 1/2014 | Markwart et al. |

(Continued)

FOREIGN PATENT DOCUMENTS

EP 2905984 A1 8/2015

OTHER PUBLICATIONS

"European Application Serial No. 16203058.9, Extended European Search Report dated May 12, 2017", 11 pgs.
(Continued)

*Primary Examiner* — Timothy J Weidner
(74) *Attorney, Agent, or Firm* — Schwegman Lundberg & Woessner, P.A.

(57) ABSTRACT

Embodiments of a Spectrum Access System (SAS) controller, Evolved Node-B (eNB) and methods for allocation of shared spectrum are disclosed herein. The SAS controller may receive an indicator that a group of channels in the shared spectrum are available for secondary usage. The SAS controller may allocate one or more channels in the group to eNBs for usage in one or more census tracts. The census tracts may include interior and exterior portions, in some cases. Fractional frequency reuse (FFR) techniques may be used in accordance with the interior and exterior portions of the census tracts for allocation of the channels. Channels may be allocated for Priority Access License (PAL) usage and/or General Authorized Access (GAA) usage, in some cases.

25 Claims, 14 Drawing Sheets

(51) Int. Cl.
*H04W 72/04* (2009.01)
*H04W 72/08* (2009.01)

(58) Field of Classification Search
CPC ..... H04W 28/16–28/26; H04W 36/08; H04W 52/30–52/346; H04W 68/12; H04W 72/0433–72/1263; H04W 76/02–76/021; H04W 80/08; H04W 88/10–88/12; H04W 88/18; H04W 92/02; H04W 92/06; H04W 92/12; H04W 92/22
See application file for complete search history.

(56) References Cited

U.S. PATENT DOCUMENTS

| 2014/0274104 | A1* | 9/2014 | Amanna, III | H04W 16/14 455/454 |
| 2016/0330743 | A1* | 11/2016 | Das | H04W 76/02 370/344 |

OTHER PUBLICATIONS

"Federal Communications Commission: Amendment of the Commission's Rules with Regard to Commercial Operations in the 3550- 3650 MHz Band", Washington D.C 20554, GN Docket No. 12-354, FCC 15-47, (Apr. 21, 2015), 187 pgs.

"Notice of Proposed Rulemaking and Order FCC 12-148", In the Matter of Amendment of the Commission's Rules with Regard to Commercial Operations in the 35503650 MHz Band, (Dec. 2012), 65 pgs.

"Report on CUS and other Spectrum Collective Use of Spectrum", Radio Spectrum Policy Group 2011 RSPG11-392, (Oct. 2011), 39 pgs.

Bhattarai, Sudeep, et al., "Defining incumbent protection zones on the fly: Dynamic boundaries for spectrum sharing", IEEE International Symposium on Dynamic Specirum Access Networks (DYSPAN) IEEE, XP032822653, (Sep. 29, 2015), 251-262.

Gundlach, Michael, et al., "Recent advances on LSA in standardization, regulation, research and architecture design", 1st International Workshop on Cognitive Cellular Systems (CCS), IEEE, XP032667925, (Sep. 2, 2014), 1-5.

He, Ying, et al., "Licensed Shared Access in distributed antenna systems enabling network virtualizatian", 1st International Conference on 5G for Ubiquitous Conneciivity, ICST, XP032735031, (Nov. 26, 2014), 76-80.

Kumar, Akshay, et al., "Dynamic Resource Allocation for Cooperative Spectrum Sharing in LTE Networks", IEEE Transactions on Vehicular Technology, IEEE Service Center, Piscataway, NJ, US, vol. 64, No. 11, XP011589411, ISSN: 00189545, (Nov. 1, 2015), 5232-5245.

Yrjola, Seppo, "Active antenna system enhancement for supporting Licensed Shared Access (LSA) concept", 9th International Conference on Cognitive Radio Oriented Wireless Networks and Communications (Crowncom); Oulu, Finland, XP002727620, (Jun. 2, 2014), 291-298.

\* cited by examiner

SPECTRUM ACCESS SYSTEM (SAS) CONTROLLER, EVOLVED NODE-B (ENB) AND METHOD FOR ALLOCATION OF SHARED SPECTRUM

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 3GPP LTE-Advanced Pro networks, although the scope of the embodiments is not limited in this respect. Some embodiments relate to primary and secondary usage of spectrum, such as shared spectrum. Some embodiments relate to spectrum access policies for shared spectrum. Some embodiments relate to Shared Access System (SAS) controllers and systems. Some embodiments relate to fractional frequency reuse (FFR) techniques.

BACKGROUND

A wireless network may support communication with mobile devices for services such as voice, data and others. In some cases, throughput or capacity demands for such services may provide challenges for the network. As an example, a large number of mobile devices may be connected to the network. As another example, high data rates may be desired by some of the mobile devices connected to the network. In some cases, a limited amount of available spectrum may be available, and the network may be unable to support the mobile devices in that spectrum. Accordingly, there is a general need for methods and systems of enabling communication for the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
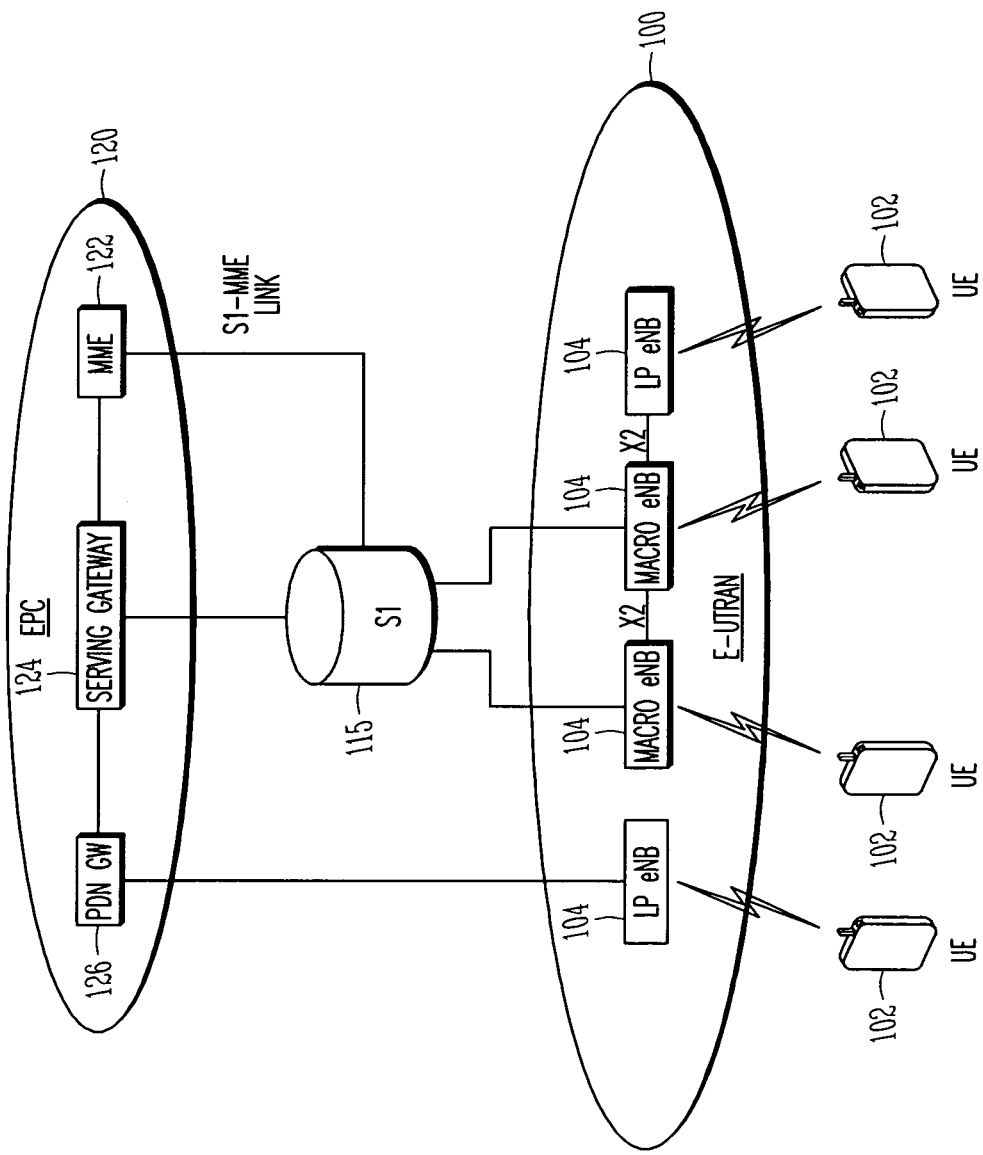
FIG. 1 is a functional diagram of a 3GPP network in accordance with some embodiments.

FIG. 1 is a functional diagram of a 3GPP network in accordance with some embodiments. It should be noted that embodiments are not limited to the example 3GPP network shown in FIG. 1, as other networks may be used in some embodiments. As an example, a Fifth Generation (5G) network may be used in some cases. Such networks may or may not include some or all of the components shown in FIG. 1, and may include additional components and/or alternative components in some cases.

The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the eNB 104 may transmit data messages to the UE 102 and may receive data messages from the UE 102. The data messages may be exchanged in shared spectrum, in some embodiments. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (which may be macro, micro, small-cell or any other Access Point type) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARD) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
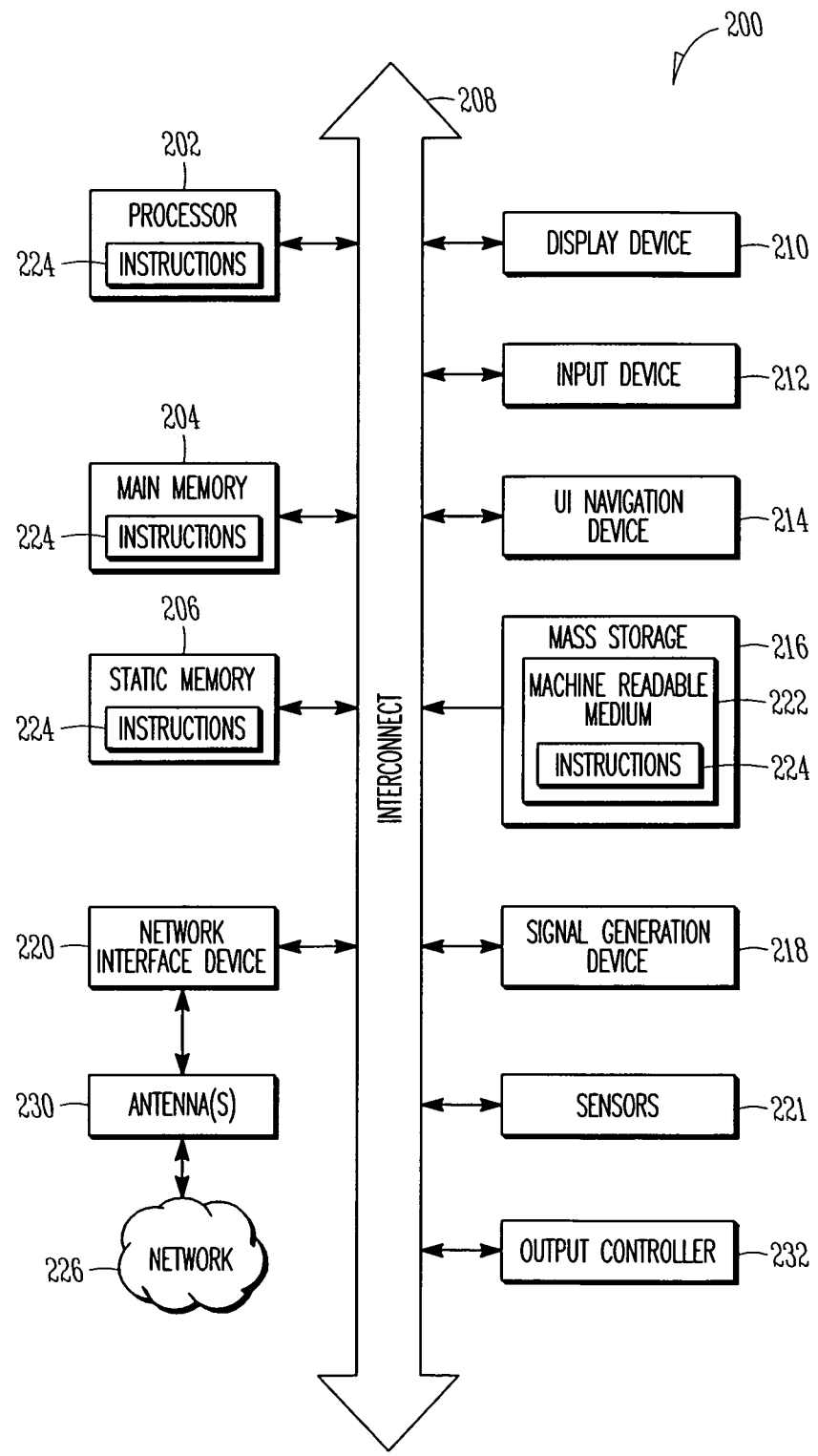
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, access point (AP), station (STA), mobile device, base station, personal computer (PC), a tablet PC, a set-top box (STB), a personal digital assistant (PDA), a mobile telephone, a smart phone, a web appliance, a network router, switch or bridge, a controller and/or controller device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
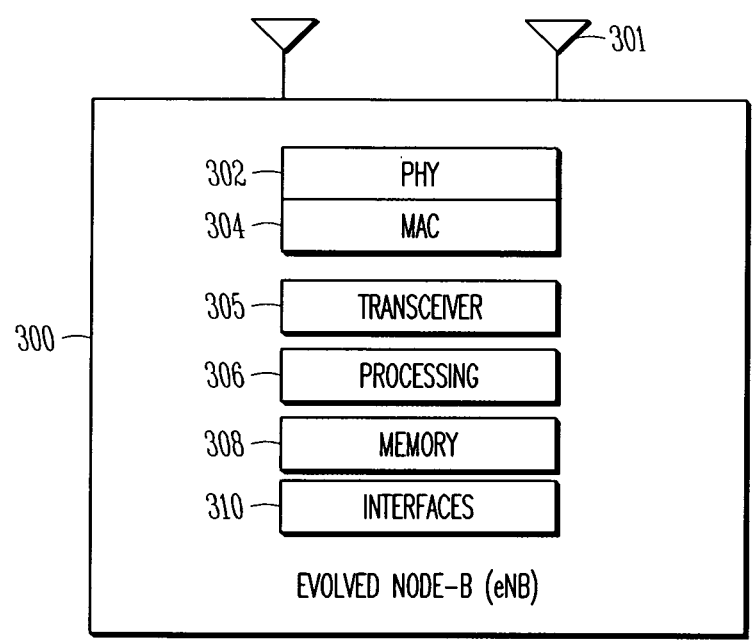
FIG. 3 is a block diagram of an Evolved Node-B (eNB) in accordance with some embodiments.

FIG. 3 is a functional diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 102, other eNBs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof. It should be noted that in some embodiments, an eNB or other base station may include some or all of the components shown in either FIG. 2 or FIG. 3 or both.

The antennas 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301 may be effectively separated to take advantage of spatial diversity and the different channel characteristics that may result.

In some embodiments, the eNB 300 and/or the UE 102 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 102, eNB 300 or other device may include one or more of a keyboard, a display, a non-volatile memory port, multiple antennas, a graphics processor, an application processor, speakers, and other mobile device elements. The display may be an LCD screen including a touch screen.

Although the eNB 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the eNB 300 may include various components of the eNB 300 as shown in FIG. 3. Accordingly, techniques and operations described herein that refer to the eNB 300 (or 104) may be applicable to an apparatus for an eNB.

In accordance with some embodiments, primary usage of shared spectrum by incumbent devices may be prioritized over secondary usage of the shared spectrum. A Spectrum Access System (SAS) controller may receive an indicator that a group of channels in the shared spectrum are available for secondary usage. The SAS controller may allocate one or more channels in the group to one or more eNBs 104 for usage in one or more census tracts. The census tracts may include interior and exterior portions, in some cases. Fractional frequency reuse (FFR) techniques may be used in accordance with the interior and exterior portions of the census tracts for allocation of the channels. Channels may be allocated for Priority Access License (PAL) usage and/or General Authorized Access (GAA) usage, in some cases. The SAS controller may send one or more configuration messages to notify eNBs 104 of the allocation of the channels, in some cases. These embodiments will be described in more detail below.

Figure 4:
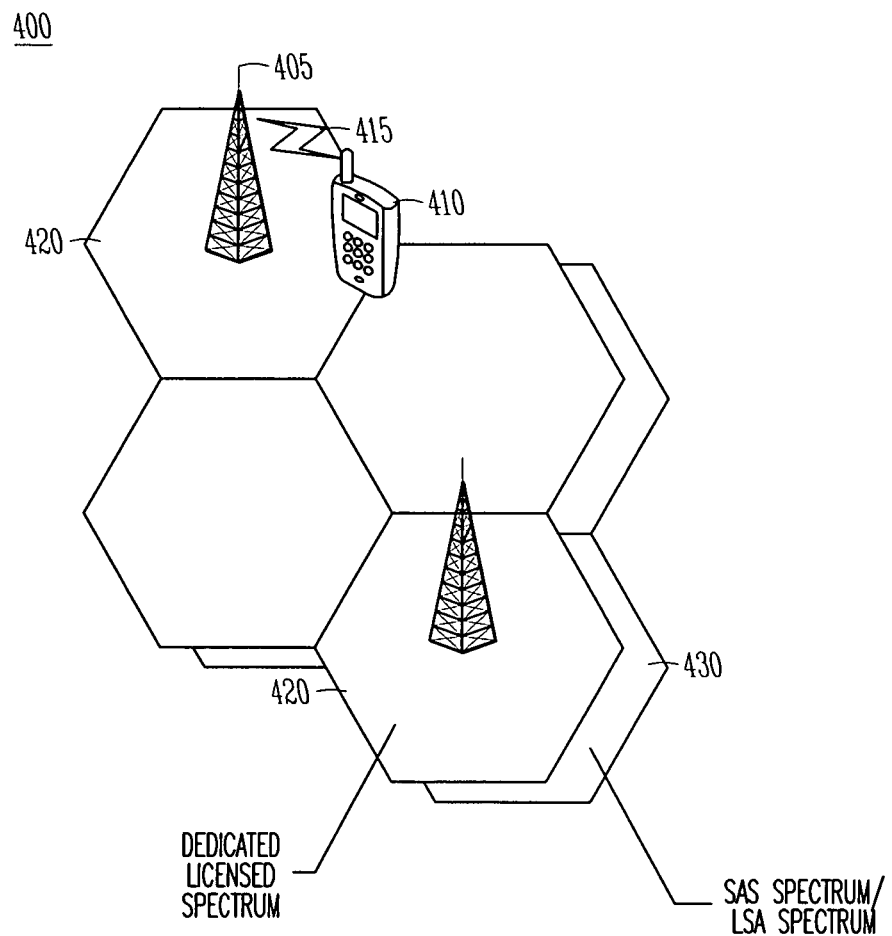
FIG. 4 illustrates an example of spectrum sharing in accordance with some embodiments.

FIG. 4 illustrates an example of spectrum sharing in accordance with some embodiments. In some embodiments, shared spectrum may be used by and/or allocated to different devices based on a usage priority. In some cases, incumbent devices and/or systems, which may be referred to as "tier-1" or other, may use the shared spectrum with a highest priority. Examples of incumbent devices and/or systems include radar, military, government and/or other devices and/or systems, although embodiments are not limited to these examples. In some cases, other devices and/or systems, which may be referred to as "tier-2" or "tier-3" or other, may use the shared spectrum in accordance with the usage priority. For instance, when incumbent devices are not using the shared spectrum, one or more base stations may use the shared spectrum for wireless communication with one or more mobile devices in compliance with applicable policies for usage of the shared spectrum. Accordingly, such tier-2 and/or tier-3 devices may include base stations, mobile devices and/or other devices in some cases. In some cases, the shared spectrum may be used by an incumbent device for primary usage and/or priority usage. Such spectrum may be used infrequently or for a limited time period in some cases. As an example, a television channel may be off the air during an overnight time period. As another example, radar signals may be transmitted in dedicated spectrum at an infrequent rate. Accordingly, the shared spectrum may be allocated for secondary usage to tier-2 devices, tier-3 devices and/or other devices, in some cases.

In some embodiments, Spectrum Access System (SAS) spectrum sharing techniques may be used, although embodiments are not limited to the use of SAS for spectrum sharing. In some embodiments, Licensed Shared Access (LSA) spectrum sharing techniques may be used, although embodiments are not limited to the use of LSA for spectrum sharing. It should be noted that embodiments are not limited to the number of eNBs 405, UEs 410, cells or other elements shown in FIG. 4. Embodiments are also not limited to the arrangement shown in FIG. 4. In addition, embodiments are not limited to the usage of eNBs 405 and UEs 410 (which may be arranged to operate according to a 3GPP LTE protocol). For instance, APs, STAs, other base station components and/or other mobile devices may be used in some embodiments.

In the spectrum sharing scenario 400, the eNB 405 may communicate with a UE 410 over the wireless link 415. As shown in FIG. 4, the top layer of cells 420 may indicate communication (between the eNB 405 and the UE 410, for instance) in dedicated licensed spectrum. The bottom layer of cells 430 may indicate communication in shared spectrum, which may be LSA spectrum in this example.

In an example of spectrum sharing using LSA techniques, a 3GPP LTE network may be operated on licensed shared basis in the 2.3-2.4 GHz frequency band which corresponds to 3GPP LTE Band 40. An incumbent (tier-1) user (or base station) may be prioritized over the licensee (tier-2) user (or base station). For instance, a mobile network operator (MNO) may be required to vacate the LSA band for a given geographic area, a given frequency range and a given period of time for which the incumbent is requiring access to the resource. In some cases, the LSA band may be combined with LTE operation in dedicated licensed spectrum through suitable Carrier Aggregation mechanisms. For instance, some legacy LTE systems may be based on FDD technology, and the 3GPP Release-12 FDD/TDD Carrier Aggregation feature may be required for a suitable combination of existing deployment with LTE LSA modes. It should be noted that the LSA system approach may also be applied to any other suitable frequency band and/or any other countries/regions. For instance, usage of a 2.7 GHz band may be a potential candidate in Japan. In other frequency bands, the spectrum sharing may be slightly modified in order to accommodate for specific requirements, such as propagation characteristics of the target frequency band, specifics (such as configuration, behavior, etc.) of the incumbent system. Typical modifications may include different signal bandwidths (instead of 10 MHz bands for SAS for example), short-time hand-over into target shared bands and out of them (due to short term spectrum availability due to behavior of incumbent user).

In an example of spectrum sharing using Spectrum Access System (SAS) techniques, a 3GPP LTE network may be operated on licensed shared basis in the 3.55-3.7 GHz frequency band which corresponds to 3GPP LTE Bands 42 and 43. In some cases, SAS may differ from LSA in that licensed spectrum slots may be only available in parts of the entire SAS band (up to 70 MHz) for so-called Primary Access License (PAL or PA) tier-2 users. The remaining part of the spectrum, as well as unused portions of the PAL spectrum ("use-it-or-share-it" rule), may be available to a new user class called General Authorized Access (GAA) tier-3 users. This tier-3 class may not exist in the LSA system definition. GAA users may typically operate LTE Licensed Assisted Access (LSA) or WiFi type systems, and may make modifications in order to be adapted to SAS requirements. For instance, such requirements may be imposed by a governing body, such as the Federal Communication Commission (FCC) or other, in some cases. It should be noted that the SAS system approach may also be applied to any other suitable frequency band and/or any other countries/regions. For instance, usage of a 2.7 GHz band may be a potential candidate in Japan. In other frequency bands, the spectrum sharing may be slightly modified in order to accommodate for specific requirements, such as propagation characteristics of the target frequency band, specifics (such as configuration, behavior, etc.) of the incumbent system. Typical modifications may include different signal bandwidths (instead of 10 MHz bands for SAS for example), short-time hand-over into target shared bands and out of them (due to short term spectrum availability due to behavior of incumbent user).

It should be noted that both systems, LSA and SAS, may be defined for usage in a specific frequency band. The basic operational principles of those systems, however, may be frequency agnostic in some cases, and may be straightforwardly applied to other bands. For instance, techniques may be applied to 3.5 GHz candidate bands in some cases.

Figure 5:
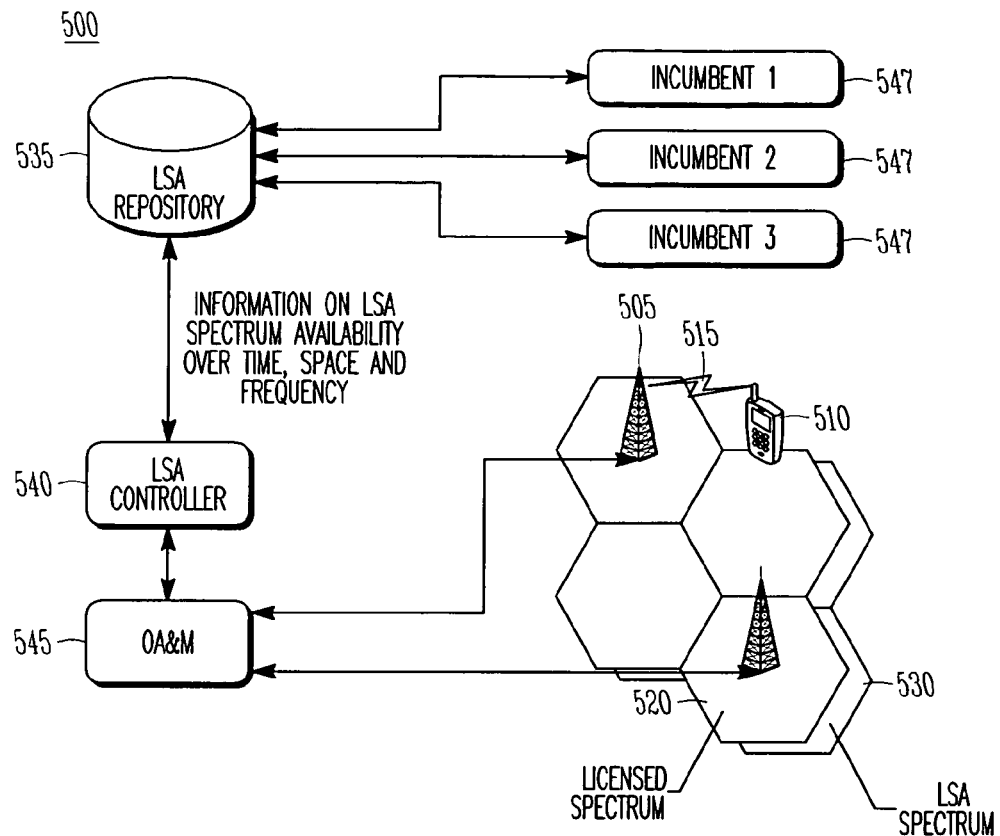
FIG. 5 illustrates an example network for a Licensed Shared Access (LSA) arrangement and an example network for a Spectrum Access System (SAS) arrangement in accordance with some embodiments.
Figure 5:
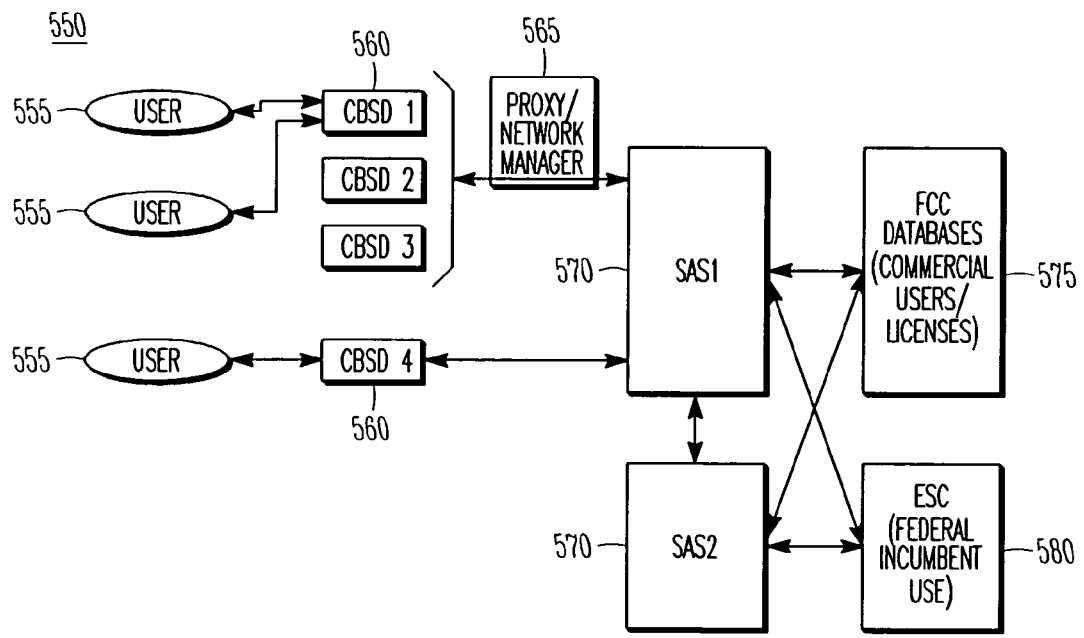

FIG. 5 illustrates an example network for a Licensed Shared Access (LSA) arrangement and an example network for a Spectrum Access System (SAS) arrangement in accordance with some embodiments. It should be noted that embodiments are not limited to the number of eNBs 505, UEs 510, base stations, mobile devices, cells or other elements shown in FIG. 5. Embodiments are also not limited to the type of components shown in FIG. 5 and/or arrangements of the components as shown in FIG. 5. In addition, embodiments are not limited to the usage of eNBs 505 and UEs 510 (which may be arranged to operate according to a 3GPP LTE protocol). For instance, APs, STAs, other base station components and/or other mobile devices may be used in some embodiments.

In the example network 500, LSA techniques may be used. The eNB 505 may communicate with a UE 510 over the wireless link 515. As shown in FIG. 5, the top layer of cells 520 may indicate communication (between the eNB 505 and the UE 510, for instance) in dedicated licensed spectrum. The bottom layer of cells 530 may indicate communication in shared spectrum, which may be LSA spectrum in the example scenario 500.

The LSA Repository 535 may be a centralized database that may be used for spectrum management in this scenario 500. The incumbent users 547 may be required to provide a-priori usage information to the LSA repository 535 (or database) on the availability of LSA spectrum over space and time. Depending on this information, the LTE system may be granted access or may be requested to vacate one or more frequency bands through control mechanisms and/or operations that may be performed (at least partly) by the LSA Controller 540. In this operational approach, sensing mechanisms may not necessarily be required to support the system for the identification of incumbent operation.

In the example network 550, SAS techniques may be used. In some embodiments, one or more SAS controllers 570 may communicate with components such as the Citizens Broadband Service Devices (CBSD) 560, FCC database 575 and/or Environmental Sensing Capability (ESC) 580 component. It should be noted that embodiments are not limited to the number, type and/or arrangement of components shown in the SAS network 550. Accordingly, embodiments are not limited to the number of SAS controllers 570 that may be used.

In addition, embodiments are not limited to the usage of CBSDs 560. A CBSD may be or may include a base station component that operates in shared spectrum according to rules defined and/or enforced by a governing body (such as the FCC) or other entity. As another example, one or more eNBs 104 may be used. Embodiments are not limited to the number, arrangement and/or type of mobile devices that may communicate with the CBSDs 560 (or other base station component) in the shared spectrum and/or other spectrum. As an example, any number of users 555 may be used, in which a user may be a mobile device and/or stationary device, such as a UE 102, STA or other.

It should be noted that although techniques, concepts and/or operations described herein may refer to eNBs 104, UEs 102 and/or other devices, embodiments are not limited to those devices. Accordingly, any suitable base station component and/or mobile device component may be used in some embodiments. For instance, CBSDs, APs and/or other base station components may be used in some embodiments. In addition, STAs and/or other mobile devices may be used in some embodiments. It should also be noted that references may be made to CBSDs 560, such as in describing the example SAS network 550, but such references are not limiting, as eNBs 104 and/or other base station components may be used in some embodiments.

In some embodiments, one or more of the CBSDs 560 may be configured as an eNB 104 arranged to operate in the 3GPP network as shown in FIG. 1 and may also be configured to operate as part of another network, such as the SAS network 550 shown in FIG. 5. Accordingly, such an eNB 104 may communicate with the MME 122, serving GW 124, and PDN GW 126 as part of the operation of the 3GPP network, and may also communicate with components included in the SAS network 550 and/or others as part of the spectrum sharing operation. Communication, by the eNB 104, with components in the two networks (3GPP and SAS) may or may not be independent and/or related.

In some embodiments, an SAS network (such as 550 and/or other) may be designed to ensure coexistence with incumbent users who may not be able to provide any a-priori information to a central database. In some cases, such design considerations may differ in comparison to LSA. In some cases, an Environmental Sensing Capability (ESC) 580 component may perform sensing tasks. As a non-limiting example, the ESC 580 may be included for military applications. In some cases, spectrum access decisions for tier-3 and tier-2 users may be based at least partly on such sensing results. As non-limiting example, unlicensed systems such as Wi-Fi (802.11) or Bluetooth, may be tier-3 users.

As an example, the FCC and/or other entity may mandate and/or advise that a spectrum sharing technique, such as SAS, be used to coordinate usage of shared spectrum between incumbent devices, PA devices and/or GAA devices. Accordingly, it may be mandatory that tier-2 and tier-3 devices communicate with the SAS constantly or at least continuously while operating in the shared spectrum in order to ensure compliance by the tier-2 and/or tier-3 devices.

It should be noted that embodiments and/or exemplary scenarios described herein may involve devices (including PAL user devices for SAS, GAA user devices for SAS, LSA Licensee user devices for LSA, incumbent users for any systems, other mobile devices, and/or other devices) operating and/or arranged to operate according to 3GPP (Third Generation Partnership Project) specifications, such as Long Term Evolution (LTE) and Long Term Evolution-Advanced (LTE-A) and LTE-Advanced Pro. However, it is understood that such embodiments and/or exemplary scenarios may be similarly applied to other mobile communication technologies and standards, such as any Cellular Wide Area radio communication technology, which may include e.g. a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), 3GPP LTE-Advanced Pro, CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 14), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), ETSI OneM2M, IoT (Internet of things), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin or "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.1 1ad, IEEE 802.11 ay and/or others) and/or others. The embodiments and/or examples provided herein are thus understood as being applicable to various other mobile communication technologies, both existing and not yet formulated.

In some cases, such devices may be arranged to support wireless and/or wired communication that may or may not necessarily be defined by a standard, in addition to or instead of the mobile communication technologies and/or standards described above.

As an example, spectrum sharing may be performed and/or implemented in the 2.3-2.4 GHz band. As another example, spectrum sharing may be performed and/or implemented in the 3.55-3.7 GHz band (US). As another example, some or all of the techniques described herein may be applicable to other frequency bands. For instance, broadband wireless communication bands below 6 GHz or mmWave bands from 6 GHz to 100 GHz may be used in some cases. In some embodiments, additional techniques may be used for spectrum sharing. For instance, techniques for accommodation of fast adaptation requirements by the incumbents may be used.

The SAS controller 570 may perform various operations related to shared spectrum, such as management of the shared spectrum, ensuring compliance with spectrum sharing policies, allocation of shared spectrum and/or others. The examples of such operations presented below are not limiting and are also not necessarily exhaustive. As examples of such operations, the SAS controller 570 may register and/or unregister CSBDs 560 (which may or may not be directly accessible); may allocate channels for use by CBSDs 560; may set power levels for the CBSDs 560 (and/or connected UEs 555 or end user devices) directly connected to it; may provide aggregate interference levels (which may relate to per-device levels, aggregate levels, sum of output power levels and/or other levels) being created by CBSDs 560 and/or connected UEs 555 or end users, receive spectrum information (such as spectrum quality information from sensing); may receive license information, rules triggers, (configuration) requirements, etc. from one or more FCC databases, such as 575 in FIG. 5; may resolve interference problems in a given area by contacting the CBSDs 560 directly registered to it; may protect higher tiers from interference from lower tiers (such as noting that noise floor or interference metrics are too high in a given area and/or contacting CBSDs 730 that claim to be operating in that area); may adjust output power levels for the area; may lower aggregate interference numbers for the area; may subdivide a census tract into smaller regions for interference management; may manage triggers, requirements, requests, etc. from the incumbent (for example, the incumbent may change protection and/or interference requirement levels for given geographic areas and/or may require that tier-2 and/or tier-3 users vacate the band or portions of the band); may manage system reconfiguration (for example, allocate of new PAL spectrum slots and/or GAA spectrum slots, re-allocate the slots, increase or decrease the number of slots and/or perform other operations); may mange sub-division of PA L/GAA spectrum slots (for example, parts of PAL/GAA spectrum slots may be allocated to or occupied by distinct stakeholders, users, MNOs and/or others entities); may manage grouping of PAL/GAA spectrum slots (for example, spectrum aggregation may be employed in order to use a larger band configuration of target systems, such as 20 MHz LTE); may manage guard bands between neighboring systems (for instance, some PAL and/or GAA slots may be allocated to act (at least partly) as guard band(s) between neighboring systems (at the lower/upper edge) of the concerned spectrum slot); may re-allocate PAL and/or GAA slots dynamically such that interference between neighboring systems is minimized; may group PAL and/or GAA users to compete within a given group for access to a given spectrum slot; may group PAL and/or GAA users of a given aggregate BW; may manage (mass) distribution of (urgent) information; may exclude specific nodes (CBSDs 560, UEs 555 and/or other end users) from accessing specific PAL/GAA spectrum slots; may manage carrier aggregation; may direct specific CBSDs 570, UEs 555 and/or other end users to stop employing CA and to use a single PAL/GAA spectrum slot only; may manage allocation of time slots (TDMA) to specific users and/or groups of users such that the PAL/GAA spectrum blocks are shared over time; may manage allocation of frequency slots (FDMA) to specific users and/or groups of users such that the PAL/GAA spectrum blocks are shared over frequency; may manage allocation of time and frequency slots (joint TDMA/FDMA) to specific users and/or groups of users such that the PAL/GAA spectrum blocks are shared over time and frequency; may manage user groups of distinct priority; may manage spectrum and/or infrastructure sharing between various operators and other stakeholders; may manage dynamic spectrum licenses; may manage end user devices switching from one CBSD 560 to another CBSD 570 (such as a hand-off); may register individual CBSDs 560, both PAL and GAA; may assign channels to individual GAA CBSD devices 560 and/or UEs 555 within network; may assign frequency/channels for the PAL CBSDs 560 to use; may assign TX power levels for GAA CBSDs 560 and/or PAL CBSDs 560; may request CBSDs 560 to change channels for interference mitigation, interference management and spectrum optimization; may request sensing reports from UEs 555 and/or CBSDs 560 and/or sensors; may compute aggregate interference being output from its devices to ensure compliance to global SAS policies; may request CBSDs 560 to change channels or change TX power to optimize spectrum usage; may assign individual power levels to each of the CBSDs 560, which in turn may manage power levels for the UEs 555 connected to them; may process trigger events related to incumbent usage of the shared spectrum (for instance, an incumbent device may require usage of primary spectrum that represents a small fraction of the entire shared spectrum, and the SAS controller 570 may identify which tier-2 and/or tier-3 users actually operate in the portion of the shared spectrum that is to be vacated, and may forward the trigger to those users); and/or other operations.

It should be noted that the SAS controller 570 may be divided into two or more controllers (such as a Private SAS and a Public SAS), in some embodiments. Such a division may have the objective to keep part of the SAS functionality with the target operator's (typically PAL and/or GAA operator) network (i.e., the Private SAS) and part of the SAS functionality outside of the target operator's network. Any other functional split of the SAS controller (or any other SAS functionality) can be envisaged. Accordingly, one or more SAS operations (such as those described above) may be performed by different SAS controller entities in some cases.

Figure 6:
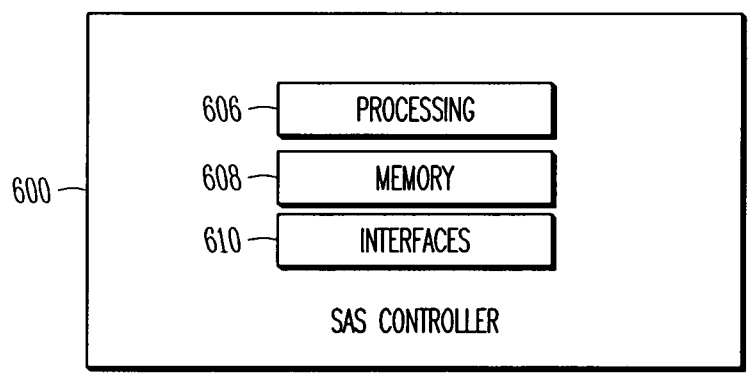
FIG. 6 is a block diagram of an SAS controller in accordance with some embodiments.

FIG. 6 illustrates an example block diagram of a SAS controller in accordance with some embodiments. The SAS controller 600 may be suitable for use as a SAS controller 570 as depicted in FIG. 5 and elsewhere herein, in some embodiments. The SAS controller 600 may include processing circuitry 606 and memory 608 arranged to perform the operations described herein. In some embodiments, the memory 608 may include a storage element adapted to store an interference level allowance and/or other information. The SAS controller 600 may also include one or more interfaces 610, which may enable communication with other components, including CSBDs 560, FCC databases 575, other SAS controllers 600 and/or other components. The interfaces 610 may be wired or wireless or a combination thereof. It should be noted that in some embodiments, a SAS controller may include some or all of the components shown in either FIG. 2 or FIG. 6 or both. Although the SAS controller 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the SAS controller 600 may include various components of the SAS controller 600 as shown in FIG. 6. Accordingly, techniques and operations described herein that refer to the SAS controller 600 may be applicable to an apparatus for a SAS controller 600, in some cases.

Figure 7:
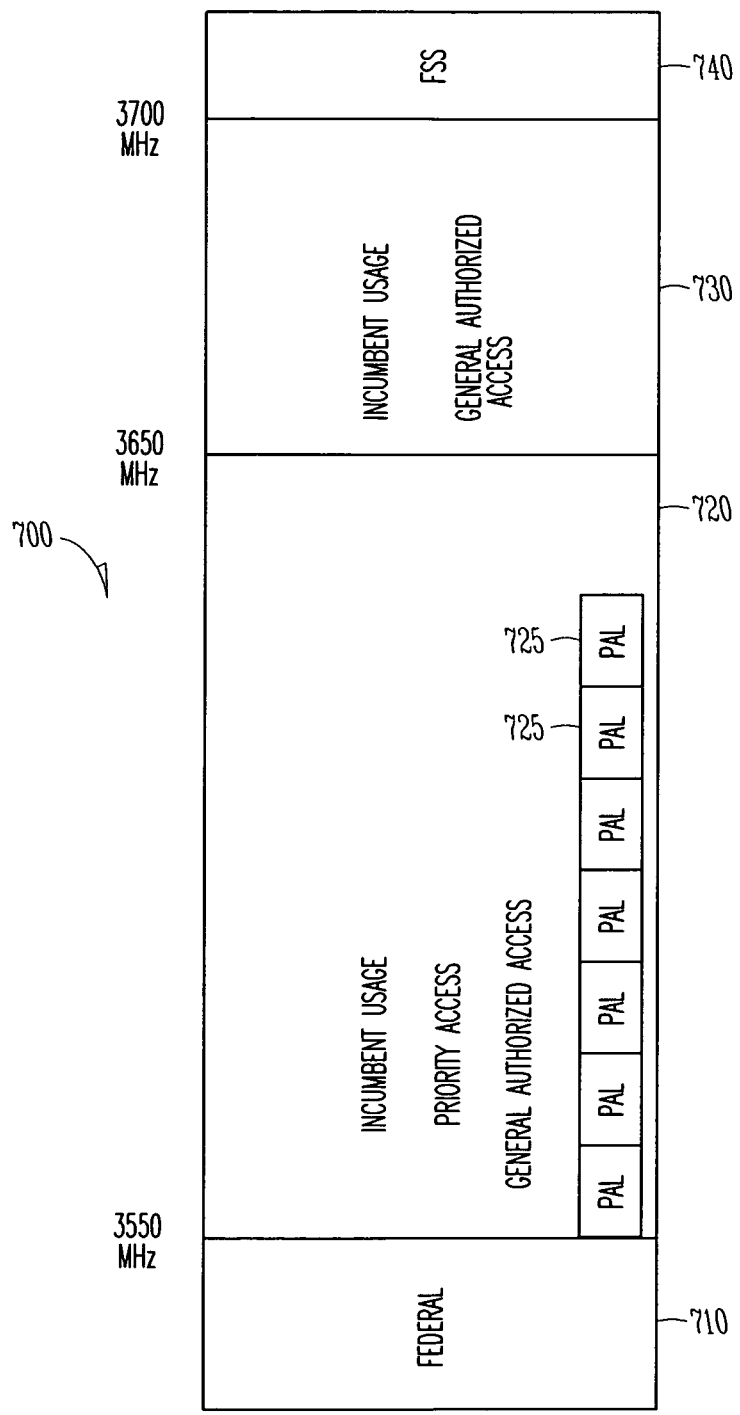
FIG. 7 illustrates an example of spectrum usage in accordance with some embodiments.

FIG. 7 illustrates an example of spectrum usage in accordance with some embodiments. It should be noted that embodiments are not limited to the example spectrum 700 in terms of number, size, type, frequency location and/or frequency span of the spectrum 700 or portions of the spectrum 700. Embodiments are also not limited to the allocation of user type (incumbent, PAL, GAA and/or other) in the spectrum 700 and/or in any portion of the spectrum 700. Embodiments are also not limited to a number of portions into which the spectrum 700 is divided.

In the example spectrum 700, a frequency band 710 may be allocated for federal usage and/or other usage. The frequency band 710 may be located in frequency below 3550 MHz, in some cases. The frequency band 720 may be allocated for incumbent usage, PAL usage and/or GAA usage. As an example, various portions 725 of the band 720 may be allocated for the PAL usage, and a portion of the remainder of the band 720 may be allocated for GAA usage. As an example, the frequency band 720 may be located in frequency between 3550 MHz and 3650 MHz, in some cases. The frequency band 730 may be allocated for incumbent usage and/or GAA usage. As an example, the frequency band 730 may be located in frequency between 3650 MHz and 3700 MHz, in some cases. The frequency band 740 may be allocated for fixed satellite service (FSS) usage and/or other usage. The frequency band 740 may be located in frequency above 3700 MHz, in some cases.

Figure 8:
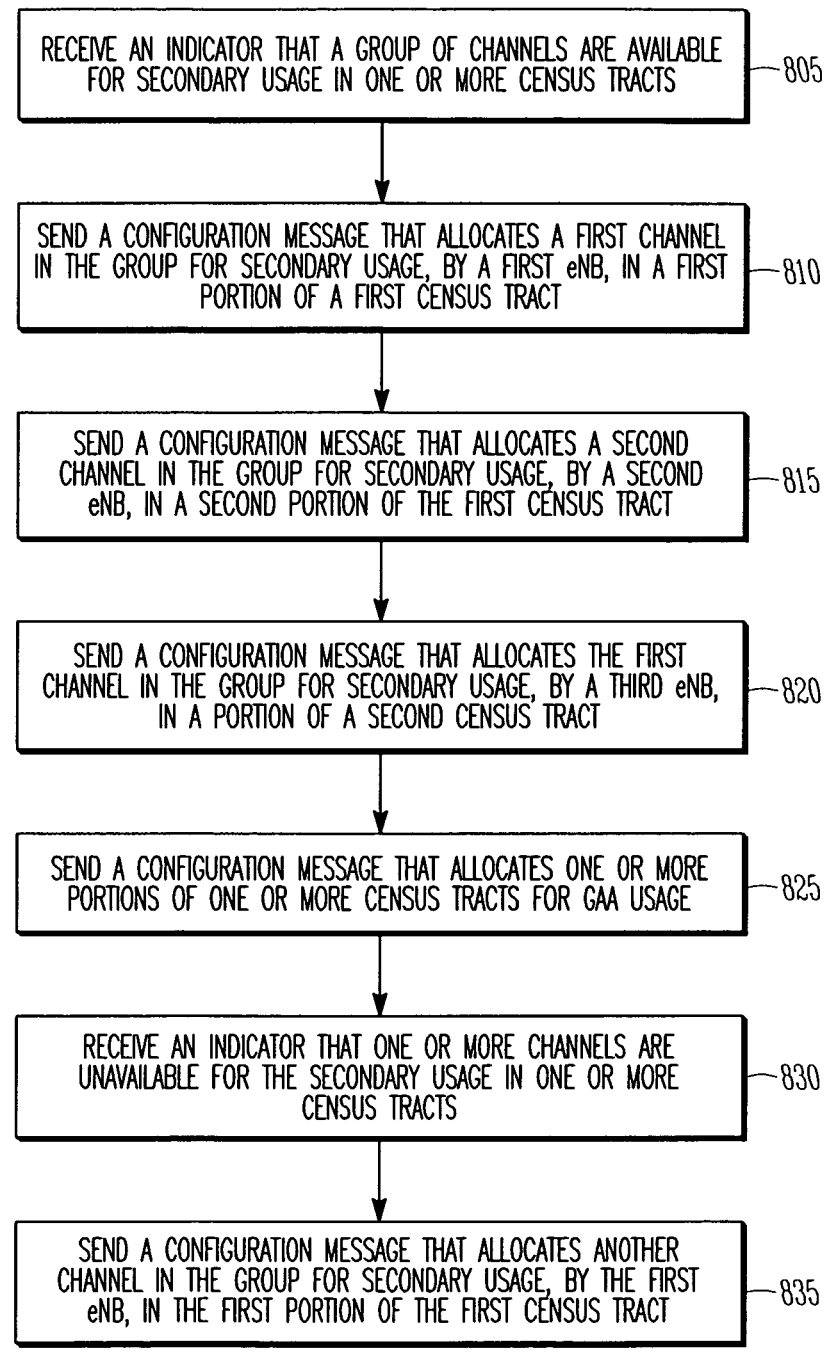
FIG. 8 illustrates the operation of a method of allocation of shared spectrum in accordance with some embodiments.

FIG. 8 illustrates the operation of a method of allocation of shared spectrum in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to FIGS. 1-7 and 9-14, although it is understood that the method 800 may be practiced with any other suitable systems, interfaces and components.

In addition, while the method 800 and other methods described herein may refer to eNBs 104 and/or UEs 102 operating in accordance with 3GPP or other standards, embodiments of those methods are not limited to just those eNBs 104 or UEs 102 and may also use other devices, such as a CSBD, Wi-Fi access point (AP) or user station (STA). In addition, the method 800 and other methods described herein may be practiced by wireless devices configured to operate in other suitable types of wireless communication systems, including systems configured to operate according to various IEEE standards such as IEEE 802.11. In some embodiments, a CBSD (such as the CBSD 560 or other) may be included as a base station component. It should be noted that the CBSD 560 may be an eNB 104 and/or may be configured to operate as an eNB 104 in some cases. Accordingly, reference may be made to an eNB 560 and/or eNB 104 in descriptions herein, but such references do not limit the scope of the embodiments. In some embodiments, an end user (such as the user 555 or other) may be included as a mobile device component. It should be noted that the user 555 may be a UE 102 and/or may be configured to operate as a UE 102 in some cases. Accordingly, reference may be made to an UE 555 and/or UE 102 in descriptions herein, but such references do not limit the scope of the embodiments It should be noted that operations and/or techniques may refer to usage of a spectrum sharing controller, in some cases. In some embodiments, the spectrum sharing controller may be configured to operate as a SAS controller 570 that may operate in a SAS network (such as the example network 550 in FIG. 5). Embodiments are not limited to SAS controllers 570, however, and are also not limited to SAS networks. In some embodiments, the method 800 may be practiced by or may use other controller devices in addition to, or instead of, the SAS controller 570. In some embodiments, the spectrum sharing controller may be configured to operate as an LSA controller that may operate in an LSA network (such as the example network 500 in FIG. 5) and/or in accordance with LSA techniques. The method 800 may also refer to an apparatus for a UE 102, eNB 104, SAS controller 570 and/or other device described above.

It should also be noted that although operations and/or techniques may be practiced in accordance with a shared spectrum usage area. As an example, shared spectrum may be allocated in accordance with LSA techniques in an entire country, in some cases. This example is not limiting, however, as shared spectrum may also be allocated in accordance with LSA techniques in smaller areas, in some cases. As an example, the shared spectrum usage area may include a geographic validity area that may be defined in an agreement, such as a sharing agreement between incumbent devices and licensees and/or other suitable agreement. Such an agreement may involve regulation administrations in some cases.

As another example, shared spectrum may be allocated in accordance with SAS techniques in census tracts in some cases. It should be noted that embodiments are not limited to these examples of the shared spectrum usage area, as any suitable area may be used in accordance with any suitable techniques (SAS, LSA and/or others) for allocation of shared spectrum in one or more regions.

The SAS controller may manage shared spectrum for a region. In some embodiments, the region may include and/or may be divided into geographic regions such as census tracts or other regions. As a non-limiting example, a census tract may cover a geographic region in which a particular number of people reside. As another non-limiting example, a census tract may cover a geographic region of a particular size. These examples are not limiting, however, as the region for which the SAS controller manages the shared spectrum may include and/or may be divided into census tracts, cells, sub-regions and/or other suitable divisions, and any suitable techniques may be used for such a division. Accordingly, the region may be divided to enable allocation of the shared spectrum, in some cases.

It should also be pointed out that in some embodiments, a PAL license may be granted to a user for usage in a particular census tract. In some cases, multiple PAL licenses may be granted for a particular census tract, and management of the shared spectrum in these and other cases may be challenging.

In some embodiments, fractional frequency reuse (FFR) techniques may be used, of which several examples will be given below. In such embodiments, the SAS controller 570 may allocate, in accordance with an FFR technique, one or more available channels of the shared spectrum to accommodate PAL licensees operating throughout the region. As an example, a census tract may be divided into and/or may include an interior portion (like a cell center region) and an exterior portion (like a cell edge region). As another example, the census tract may be divided into and/or may include multiple interior portions in some cases. As another example, the census tract may be divided into and/or may include multiple exterior portions in some cases. In accordance with such divisions, the SAS controller 570 may allocate different channels to different portions of different census tracts, in some embodiments.

At operation 805 of the method 800, the SAS controller 570 may receive an indicator that a group of one or more channels are available for secondary usage in one or more census tracts. In some embodiments, the secondary usage may include usage by one or more eNBs 560 (and/or other base station device) for communication with one or more UEs 555 (and/or other mobile device), although the scope of embodiments is not limited in this respect. In some embodiments, the channels may be included in shared spectrum reserved for primary usage by an incumbent device. For instance, the primary usage by the incumbent device may be part of priority usage of the shared spectrum. In some embodiments, the SAS controller 725 may receive one or more messages (such as messages from another controller device and/or other component) that may indicate an availability (or unavailability) of the shared spectrum (or one or more channels and/or portions of the shared spectrum) for secondary usage by the eNBs 560 for communication with one or more UEs 555.

In some embodiments, the SAS controller 570 may also receive information related to transmit power levels and/or interference levels that may be permitted and/or desired for the eNBs 560. For instance, the eNBs 560 may be located in a geographic area, and the SAS controller 570 may receive such information for the geographic area. In some cases, the SAS controller 570 may receive high level information and/or guidelines for this purpose. As an example, the SAS controller 570 may receive information for a particular eNB 560, PAL license, census tract and/or portion of a census tract, such as a transmit power limit or other information. As another example, the SAS controller 570 may determine transmit power limits and/or other information for a particular eNB 560, PAL license, census tract and/or portion of a census tract. Accordingly, the SAS controller 570 may send such information to one or more eNBs 560. For instance, the information may be included in one or more configuration messages sent to the one or more eNBs 560 as part of the allocation of channels, in some cases.

As an example, an availability of the shared spectrum for the secondary usage may be restricted to inactivity periods of one or more incumbent devices. As another example, an availability of the shared spectrum for the secondary usage may be based at least partly on an inactivity condition of the incumbent devices. As another example, an unavailability of the shared spectrum for the secondary usage may be based at least partly on an activity condition of the incumbent devices. As another example, the availability may be based at least partly on one or more scheduled periods of inactivity for the incumbent devices in the shared spectrum. As another example, the inactivity condition may be limited to a geographic area. For instance, the geographic area may include a zone, such as an Exclusion zone, Restriction zone, Protection zone and/or other zone.

As another example, the inactivity condition may be related to a predetermined threshold of activity and/or interference (such as an interference level allowance and/or other). For instance, the inactivity condition may occur when a level of interference to an incumbent is below the threshold. In some embodiments, the interference threshold may be or may be based on an interference level allowance. For instance, the interference level allowance may be related to a maximum permitted interference level. As an example, the interference level may be related to an aggregate interference level. As another example, the level may be related to individual interference levels from individual devices. These examples are not limiting, however, as any suitable interference level may be used.

The SAS controller 570 may send one or more configuration messages to one or more eNBs 560 to allocate one or more channels in the group for secondary usage. At operation 810, the SAS controller 570 may send a configuration message that allocates a first channel (in the group of available channels in the shared spectrum) for secondary usage, by a first eNB 560, in a first portion of a first census tract. At operation 815, the SAS controller 570 may send a configuration message that allocates a second channel in the group for secondary usage, by a second eNB 560, in a second portion of the first census tract. At operation 820, the SAS controller 570 may send a configuration message that allocates the first channel for secondary usage, by a third eNB 560, in a portion of a second census tract. Embodiments are not limited to the configuration messages sent in operations 810-820, as these and/or other configuration messages may allocate these and/or other channels to these and/or other eNBs 560 in these and/or other census tracts, in some cases. In addition, embodiments are not limited to usage of separate configuration messages for allocation of channels. For instance, a single configuration message may allocate multiple channels, may allocate channels to multiple eNBs 560 and/or may allocate channels in multiple census tracts, in some cases.

As an example, the SAS controller 570 may allocate a first channel for secondary usage in an interior portion of a first census tract that is surrounded by one or more exterior portions. Accordingly, secondary usage of the first channel in the exterior portions of the first census tract may be restricted and/or prohibited, in some cases. In addition, the SAS controller 570 may allocate a second channel for secondary usage in one of the exterior portions of the first census tract. The SAS controller 570 may select the first and/or second channels based on metrics such as adjacent channel interference levels (measured levels and/or expected levels). That is, the SAS controller 570 may select a second channel for which usage is not expected to interfere significantly with usage in the first channel. In some cases, interference thresholds (such as an interference level allowance and/or other) may be used as part of selection of the channels to be allocated. For instance, a minimum frequency spacing between the second channel and the first channel may be used to determine which channels may be allocated in bordering census tracts. The minimum frequency spacing may also be used to determine which channels may be allocated in an interior and exterior portion of a same census tract, in some cases.

Continuing the example, the SAS controller 570 may also allocate the first channel in a portion (either exterior or interior or other) to a second census tract. The second census tract may or may not border the first census tract. The SAS controller 570 may select the second census tract in which the first channel is to be allocated based on metrics such as co-channel interference levels (measured levels and/or expected levels). That is, the SAS controller 570 may select the second census tract (and/or a co-channel minimum distance or similar measure) in which usage is not expected to interfere significantly with usage of the first channel in the first census tract. In some cases, interference thresholds (such as an interference level allowance and/or other) may be used as part of selection of the census tracts and/or channels to be allocated. For instance, a minimum geographic distance between census tracts and/or portions of census tracts may be used to determine which census tracts and/or portions of census tracts may be allocated a same frequency channel.

Although embodiments are not limited as such, the secondary usage in this example may include secondary usage in accordance with PAL usage. Accordingly, an eNB 560 to which a channel is allocated for a census tract may be registered with a PAL license for that census tract, in some cases.

At operation 825, the SAS controller 570 may send a configuration message that allocates one or more portions of one or more census tracts for GAA usage. As an example, an exterior portion of a first census tract may be allocated one or more channels for GAA usage, and the exterior portion may be located between an interior portion of the first census tract and an interior portion of a second neighboring census tract. As another example, an entire census tract may be allocated for GAA usage. As another example, an entire census tract may be allocated for PAL usage, and a neighboring census tract may be allocated for GAA usage.

At operation 830, the SAS controller 570 may receive an indicator that one or more channels are unavailable for the secondary usage. That is, one or more channels previously available for the secondary usage may become unavailable for any suitable reason, such as reclaiming of the spectrum by the incumbent, activity of the incumbent and/or other reasons like those described herein.

The SAS controller 570 may perform various operations when one or more channels are no longer available, including re-assignment of spectrum to eNBs 560 that may be using the channels that are unavailable and/or are to become unavailable. As an example, the SAS controller 570 may determine an alternative assignment of channels in neighboring census tracts to accommodate the unavailability of one or more channels. As an example, at operation 835, the SAS controller 570 may send one or more configuration messages that may allocate another channel in the group for secondary usage by the first eNB 560 in the first portion of the first census tract. The operation 835 may be performed when a channel previously allocated to the first eNB 560 for usage in the first portion of the first census tract is no longer available.

In addition, the SAS controller 570 may send, to one or more eNBs 560, a request for interference measurements, spectrum information, channel sensing information and/or other measurements, which may be related to the secondary usage in allocated channels of the shared spectrum. As an example, output power measurements, received power measurements and/or signal quality measurements at the eNBs 560 and/or UEs 555 may be requested, received and/or used. The SAS controller may use such information as part of frequency planning, in some cases. For instance, a second allocation of the channels and/or second set of transmit power levels may be determined to reduce, mitigate and/or manage overall system interference, in some cases. For instance, the determination may be performed based when one or more interference levels are determined to be too high. For instance, one or more interference levels may exceed an interference level allowance, in some cases.

In some embodiments, the SAS controller 570 may be notified, by an incumbent device and/or other component, of an unavailability of the shared spectrum. The SAS controller 570 may indicate the unavailability to the eNBs 560 and may indicate that the eNBs 560 are to vacate the shared spectrum. As an example, the unavailability may be based at least partly on activity of one or more incumbent devices. As another example, the unavailability may be based at least partly on an intention of the incumbent device(s) to retake the shared spectrum for primary usage. As another example, the unavailability may be based at least partly on a resumption of spectrum activity for the incumbent devices in the shared spectrum. As another example, the unavailability may be based at least partly on one or more scheduled periods of activity for the incumbent devices in the shared spectrum.

Figure 9:
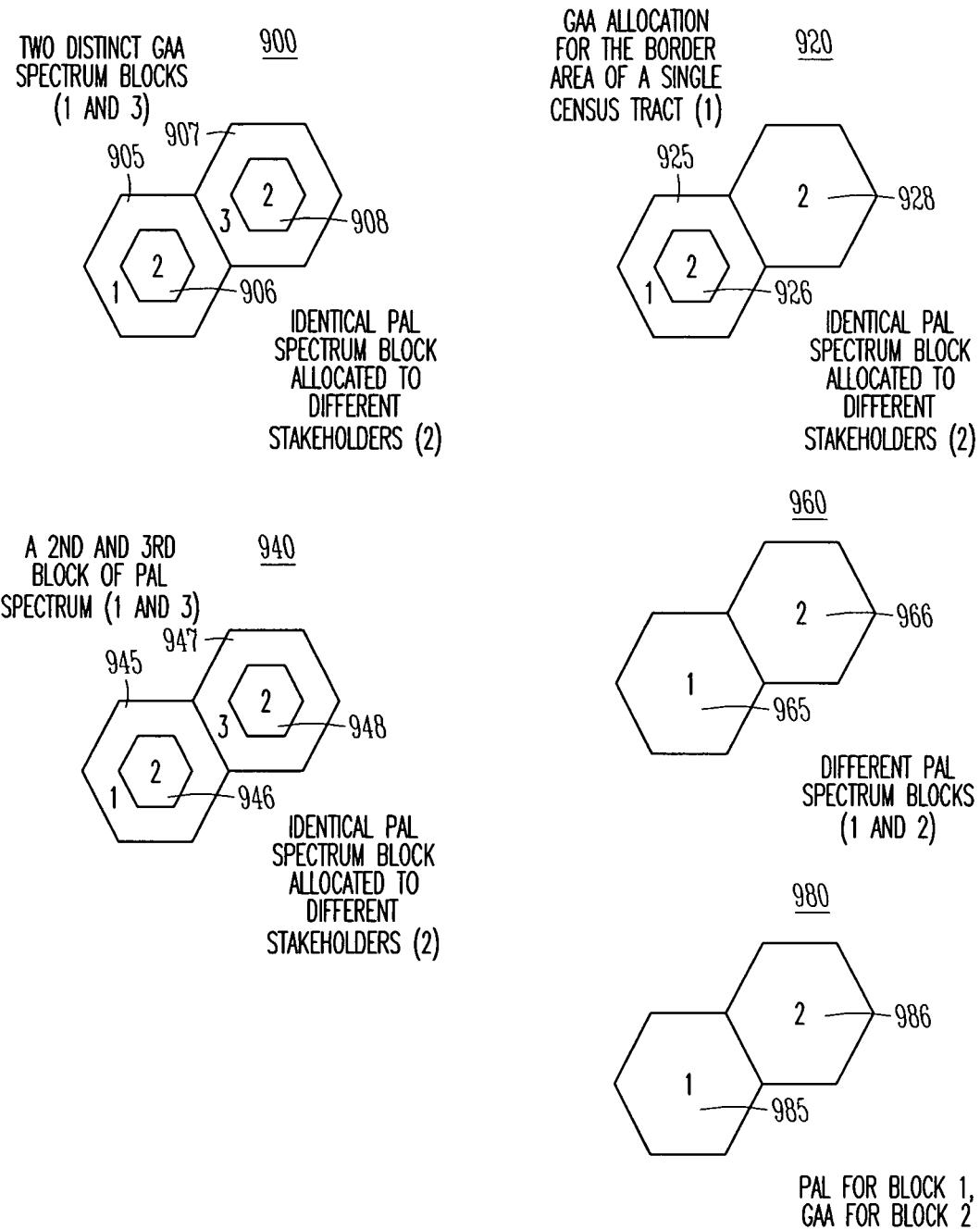
FIG. 9 illustrates examples of allocation of spectrum in accordance with some embodiments.
Figure 10:
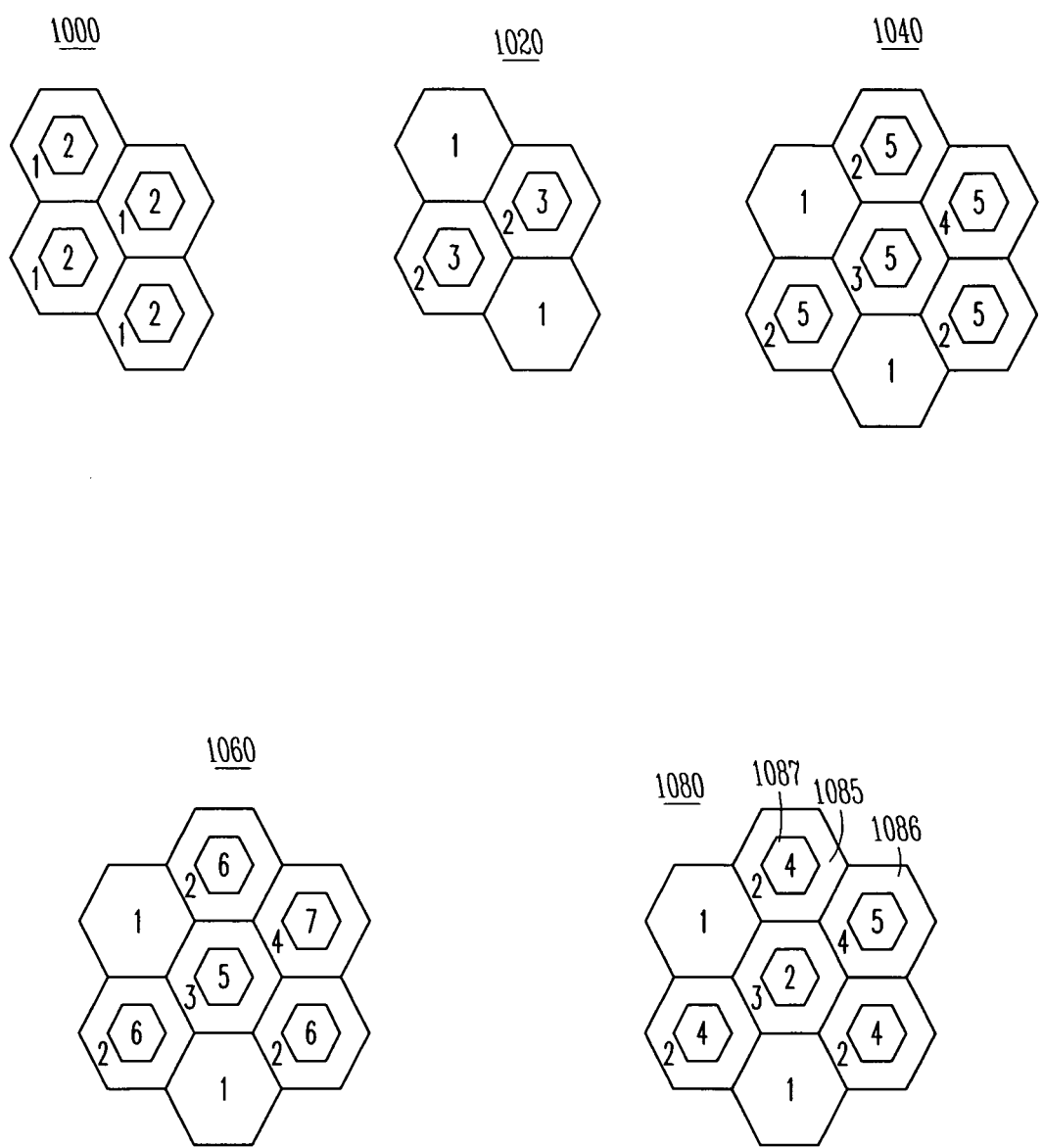
FIG. 10 illustrates examples of allocation of spectrum in accordance with some embodiments.
Figure 11:
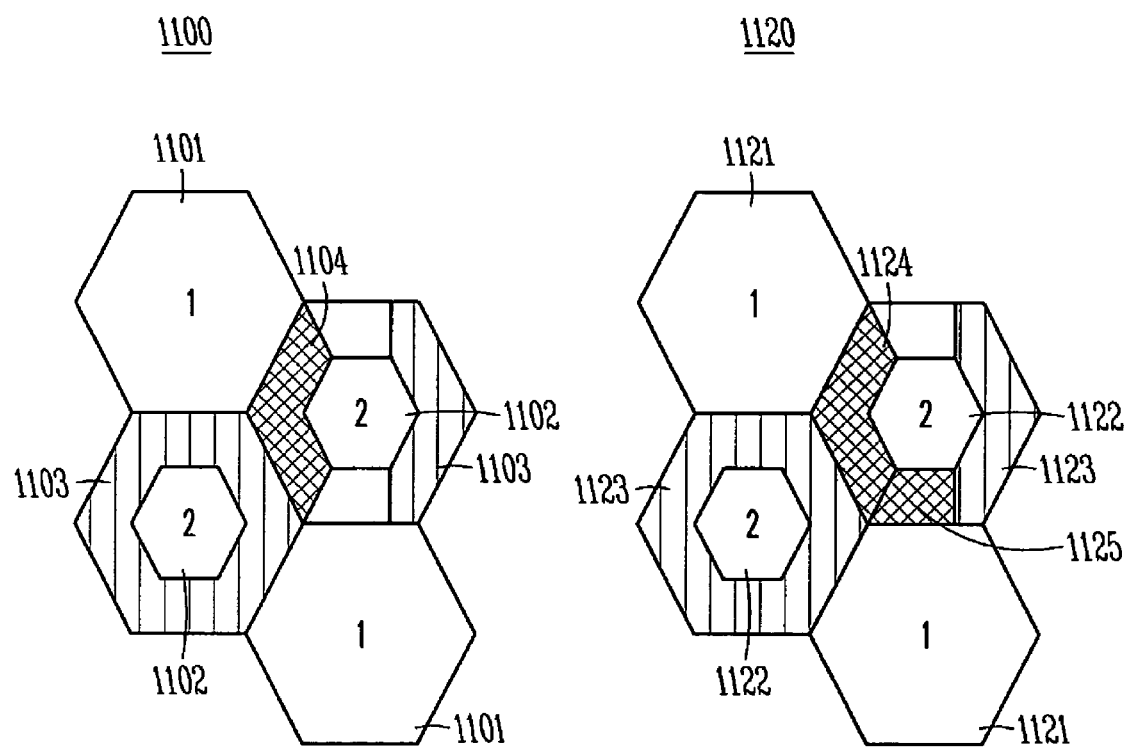
FIG. 11 illustrates examples of allocation of spectrum in accordance with some embodiments.
Figure 12:
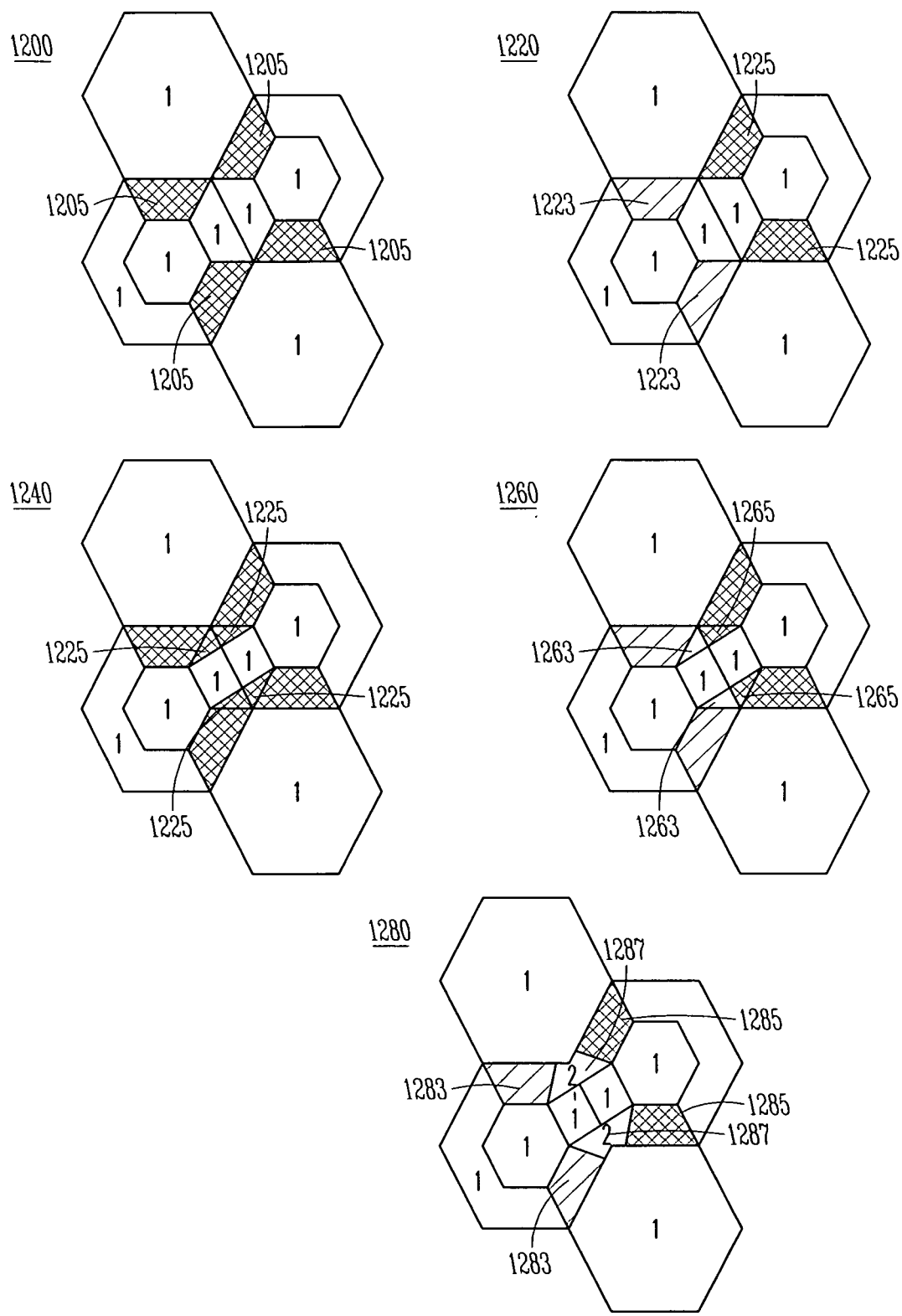
FIG. 12 illustrates examples of allocation of spectrum in accordance with some embodiments.
Figure 13:
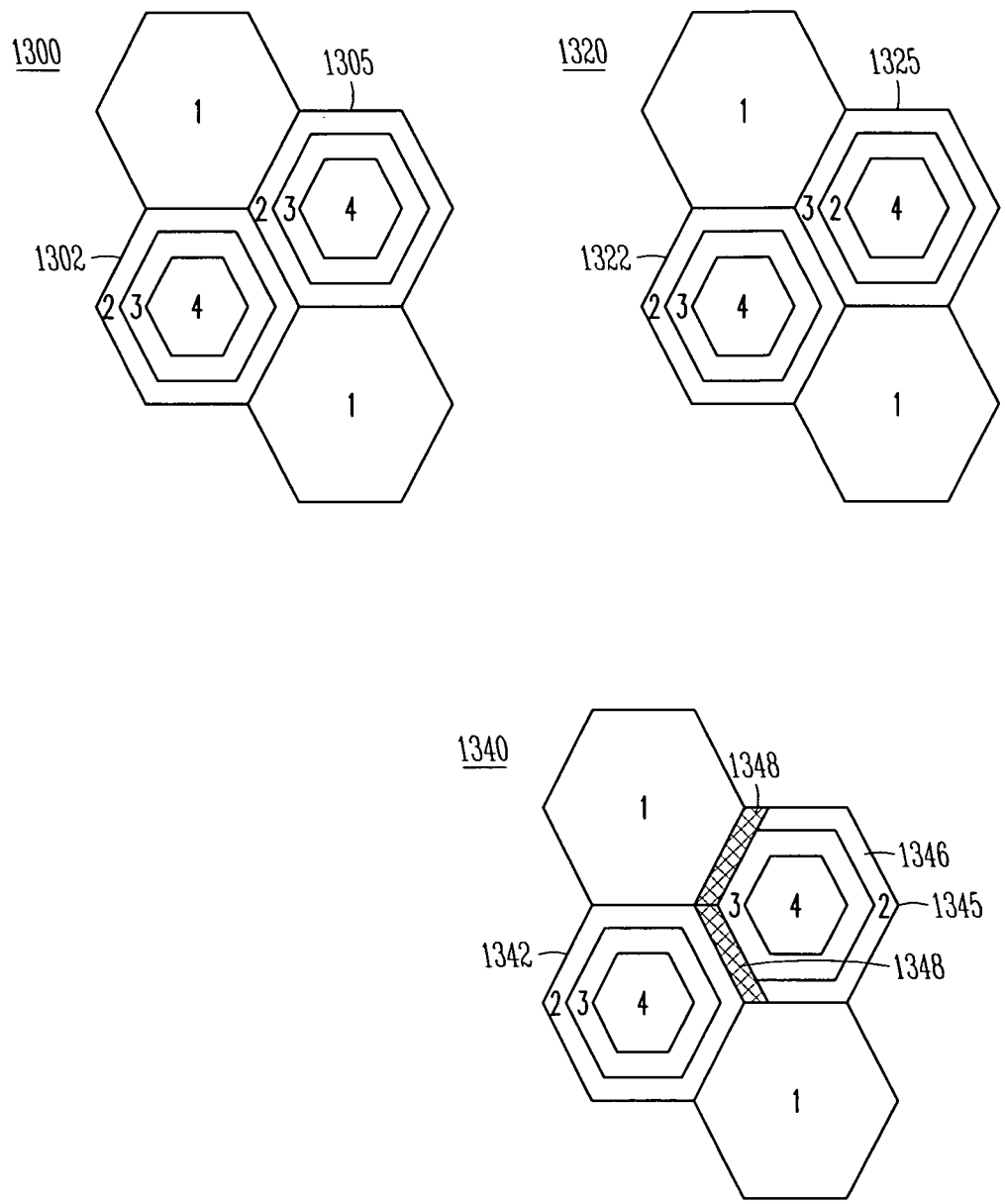
FIG. 13 illustrates examples of allocation of spectrum in accordance with some embodiments.

FIG. 9 illustrates examples of allocation of spectrum in accordance with some embodiments. FIG. 10 illustrates examples of allocation of spectrum in accordance with some embodiments. FIG. 11 illustrates examples of allocation of spectrum in accordance with some embodiments. FIG. 12 illustrates examples of allocation of spectrum in accordance with some embodiments. FIG. 13 illustrates examples of allocation of spectrum in accordance with some embodiments. It should be noted that the examples shown in FIGS. 9-13 may illustrate some or all of the concepts, techniques and/or operations described herein, but embodiments are not limited by the examples. Accordingly, the shapes and layouts of cells and/or census tracts, spectrum types, spectrum assignments, frequency reuse arrangements and other aspects of the examples shown in FIGS. 9-13 are not limiting.

In addition, although regions for cells and/or census tracts shown in the examples in FIGS. 9-13 are illustrated using hexagonal shapes, it is understood that embodiments are not limited to hexagonal shapes or other shapes. In some cases, techniques shown in the examples may be extended to other shapes, such as rectangular, circular and/or others. For instance, boundaries, center portions, edge portions and other portions of a cell and/or census tract as shown may be any shape. As an example, a center portion of a hexagonal shape may also be hexagonal in the examples shown, but embodiments are not limited as such. Similarly, a center portion of a rectangular shape may also be rectangular, although embodiments are not limited as such. In addition, embodiments are not limited to any shape, as a geographic region of a cell and/or census tract may take any shape. Such a shape may not necessarily be describable in terms of common shapes such as rectangles, hexagons, lines, arcs and/or others, in some cases. That is, a cell and/or census tract may cover a geographic region that may not necessarily include any common shapes. Boundaries of a cell and/or census tract may not necessarily include any common shapes such as lines, arcs, and/or others. As an example, a cell and/or census tract may be irregular in shape. As another example, boundaries of a cell and/or census tract may be irregular in shape. As another example, the geographic area covered by a cell and/or census tract may include one or more "free-form" shapes. As another example, the boundaries of a cell and/or census tract may include one or more "free-form" curves.

As another example, a census tract may cover a geographic region in which a particular number of people reside and census tracts may be applicable to geographic regions of different shapes. As another example, a cell, sector and/or other coverage area may be applicable to geographic regions of different shapes. As another example, two cells and/or census tracts in a same geographic area may be similar in shape in some cases, but may be different in other cases. As another example, two cells and/or census tracts in two different areas may or may not be similar in shape. As another example, cells, sectors, census tracts and/or other coverage areas may be applicable to a region that may take a shape (or approximate shape) such as a circle, wedge, hexagon and/or other, in some cases. In addition, some of the regions shown in the examples may be and/or may include edge regions, center regions and/or other types of regions, although embodiments are not limited as such.

It should also be noted that spectrum (in terms of type and/or frequency location) may be allocated to different cells, census tracts and/or regions by the SAS controller 570, although embodiments are not limited as such. In some cases, such spectrum may be allocated by another component and/or may be pre-allocated. In some embodiments, the SAS controller 570 may perform operations to manage such allocations and/or to ensure compliance with such allocations.

Referring to the example scenario 900 shown in FIG. 9, a first census tract may include regions 905 and 906, while a second census tract may include regions 907 and 908. The edge regions 905 and 907 may be allocated two distinct GAA spectrum blocks (labeled as "1" and "3"). Accordingly, interference mitigation may be realized through allocation of the two different GAA spectrum blocks to the borders of the two census tracts. In addition, regions 906 and 908 may be allocated an identical PAL spectrum block (labeled as "2"). For instance, the PAL spectrum block may be allocated to two different stakeholders across the two neighboring census tracts, in some cases.

Referring to the example scenario 920 shown in FIG. 9, a first census tract may include regions 925 and 926, while a second census tract may include region 928. The edge region 925 of the first census tract may be allocated a GAA spectrum block (labeled as "1"). In addition, the center region 926 of the first census tract and the region 928 of the second census tract may be allocated an identical PAL spectrum block (labeled as "2"). For instance, the PAL spectrum block may be allocated to two different stakeholders in the two census tracts, in some cases. In the example scenario 920, it may be sufficient to use a dual-frequency allocation in just one (the first) of the two neighboring census tracts. The allocation of the border area of the first census tract may provide interference protection from the neighboring (second) census tract in some cases.

Referring to the example scenario 940 shown in FIG. 9, a first census tract may include regions 945 and 946, while a second census tract may include regions 947 and 948. The center regions 946, 948 may be allocated a first block of PAL spectrum (labeled as "2"). As a non-limiting example, the first block of PAL spectrum may be allocated to two different stakeholders in the two census tracts, in some cases. In addition, the edge region 945 may be allocated a second block of PAL spectrum (labeled as "1") and the edge region 947 may be allocated a third block of PAL spectrum (labeled as "3"). Accordingly, the allocation of different blocks of PAL spectrum to the edge regions 945 and 947 may provide interference protection, in some cases.

Referring to the example scenario 960 shown in FIG. 9, a first census tract may include region 965, while a second census tract may include region 966. A first PAL spectrum block (labeled as "1") may be allocated to the first census tract while a second PAL spectrum block (labeled as "2") may be allocated to the second census tract. Accordingly, a PAL spectrum block used in one of the census tracts may not be used in a neighboring census tract. In some cases, usage of the PAL spectrum block in the neighboring census tract may be restricted and/or prohibited. Such an arrangement may result in a low spectrum usage but may also provide a high level of interference protection, in some cases.

As an example, an interference mitigation arrangement may be employed, in which the SAS controller 570 may switch a PAL frequency of a neighboring census tract when both become operational. For instance, only one PAL frequency may be operational when a new PAL frequency becomes operational in a neighboring census tract. One of the census tracts may be switched to a new PAL frequency in this case. That is, the SAS controller 570 may allocate a same PAL frequency to adjacent census tracts to maximize and/or improve GAA usage, but may switch one of the census tracts to a different PAL frequency if both networks become operational.

As another example, one or more edge channels may have receiver design issues, in some cases, and devices using those channels may have to use a lowered transmit power.

Accordingly, such channels may be considered undesirable, but may also be used to minimize interference between adjacent census tracts. For instance, in some cases, allocation of PAL frequencies to adjacent census tracts may be necessary, and the edge channels may be used in such cases.

Referring to the example scenario 980 shown in FIG. 9, a first census tract may include region 985, while a second census tract may include region 986. A PAL spectrum block (labeled as "1") may be allocated to the first census tract while a GAA spectrum block (labeled as "2") may be allocated to the second census tract. Accordingly, usage of the PAL spectrum block and GAA spectrum block in adjacent census tracts may enable interference protection in some cases.

Referring to the example scenario 1000 shown in FIG. 10, four census tracts are shown, each with a center portion and an edge portion. In the example scenario 1000, the center portions may be allocated a first block of frequency while the edge portions may be allocated a second block of frequency, although embodiments are not limited as such. In the example scenario 1020 shown in FIG. 10, the edge portions of two census tracts may be allocated with a second block of spectrum (labeled "2") while the center portions of those two census tracts may be allocated with a third block of spectrum (labeled "3"). Users operating in the census tracts labeled by "1" may be allocated full frequency access, in some cases. It should be noted that in the example scenario 1020, PAL spectrum labeled by "2" may be allocated to a census tract for cell edge users between two cells having full frequency access for all users (labeled by "1").

In the example scenario 1040, an orthogonal allocation of PAL spectrum is shown. The three blocks of PAL spectrum labeled "2" and "3" and "4" may be allocated as shown in an interleaved manner in which adjacent edge portions are allocated different PAL spectrum blocks. Users operating in the census tracts labeled by "1" may be allocated full frequency access, in some cases. Users operating in the center portions labeled by "5" may be allocated other frequency portions, in some cases, which may or may not be the same allocation to census tracts labeled by "1". It should be noted that in the example scenario 1040, PAL spectrum labeled by "2" may be allocated to a census tract for cell edge users between two cells having full frequency access for all users (labeled by "1").

In the example scenario 1060, another orthogonal allocation of PAL spectrum is shown. The three blocks of PAL spectrum labeled "2" and "3" and "4" may be allocated as shown in an interleaved manner in which adjacent edge portions are allocated different PAL spectrum blocks. In addition, the blocks of PAL spectrum labeled "5" and "6" may be allocated to center portions as shown. It should be noted that in the example scenario 1060, PAL spectrum labeled by "2" may be allocated to a census tract for cell edge users between two cells having full frequency access for all users (labeled by "1").

In the example scenario 1080, another orthogonal allocation of PAL spectrum is shown. The three blocks of PAL spectrum labeled "2" and "3" and "4" may be allocated to edge portions as shown in an interleaved manner in which adjacent edge portions are allocated different PAL spectrum blocks. In addition, the blocks of PAL spectrum labeled "2" and "4" may also be allocated to center portions as shown. As an example, the PAL spectrum labeled as "4" may be allocated in center portion 1087 of a first census tract and may also be allocated in edge portion 1086 of a second census tract. The edge portion 1085 may be located between the portions 1086 and 1087 and may be allocated a different PAL spectrum (labeled as "2"), which may provide interference protection for users in those areas, in some cases. Although embodiments are not limited as such, the usage of one or more PAL spectrum blocks in both an edge portion and a center portion may be performed when there are not enough PAL spectrum blocks to realize an allocation such as 1060. It should also be noted that in the example scenario 1080, PAL spectrum labeled by "2" may be allocated to a census tract for cell edge users between two cells having full frequency access for all users (labeled by "1").

Referring to the example scenario 1100 shown in FIG. 11, four census tracts are shown, each with a center portion and an edge portion. The cell edges 1103 may be allocated a first block of PAL spectrum, as demarcated by the dashed-line configuration. As shown in FIG. 11, a shaded portion 1104 of one of those cell edges may be allocated a second block of PAL spectrum. The shaded portion 1104 may be located between the portions 1103 and may provide interference protection in some cases. Referring to the example scenario 1120 shown in FIG. 11, the scenario 1100 may be modified in a manner in which an additional shaded portion 1125 of one of the edge portions may also be allocated. Accordingly, additional interference protection between the portions 1103 may be provided by adding the additional shaded portion 1125 (similar to extending the shaded portion 1104 in the scenario 1100).

Referring to the example scenarios 1200-1280 shown in FIG. 12, several examples of dividing one or more edge portions for assignment of PAL blocks may be performed. It should be noted that the shaded portions and dashed-line portions may be allocated different blocks of PAL spectrum in some cases. As an example, the shaded portions may be allocated a first block of PAL spectrum and the dashed-line portions may be allocated a second block of PAL spectrum. As another example, more than two blocks of PAL spectrum may be allocated in portions illustrated in any of the scenarios 1200-1280 in FIG. 12. In addition, although several portions are labeled as "1" in the example scenarios 1200-1280, embodiments are not limited to allocation of the same spectrum to those portions labeled as "1". For instance, such scenarios may be illustrated by replacing some of those labels with other labels that may represent allocation of other spectrum.

In the example scenario 1200, the shaded portions 1205 may be allocated a block of PAL spectrum. As shown in this and other examples in FIG. 12, embodiments are not limited to allocation of a block of PAL spectrum to an entire edge portion. That is, one or more portions of an edge portion may be allocated a first block of PAL spectrum. In some cases, other portions of the edge portion may be allocated other spectrum. For instance, other portions of the edge portion may be allocated a second block of PAL spectrum. In the example scenario 1280, the region 1287 (labeled "2") may include portions of multiple cell edges. For instance, the dashed-line portions 1283 may be part of a first cell edge portion and the shaded portions 1285 may be part of a second cell edge portion. The region 1287 may include portions of the first cell edge portion and the second cell edge portion.

It should be pointed out that the regions shown in the examples 1200-1280 may illustrate different allocations of spectrum to cell edge portions and/or cell center portions. Embodiments are not limited to the geometry shown in these examples 1200-1280, but partitioning techniques used for creating regions like 1287 may be used in other embodiments that may be based on different geometric layouts. For instance, when the census tracts are based on regions that are rectangular or roughly rectangular, such rectangular regions may be partitioned in any suitable manner as part of the allocation of spectrum.

Referring to the example scenarios 1300-1340 shown in FIG. 13, additional examples of dividing the census tracts into multiple regions are shown. In these examples, the census tracts may be divided into multiple inner portions and/or outer portions. In the example scenario 1300, the census tract 1302 may be divided into three concentric regions, which may be allocated PAL blocks (labeled "2" and "3" and "4"). The census tract 1305 may be divided in a similar manner. In the example scenario 1320, the census tract 1322 may be divided in a similar manner to census tract 1302 and may be allocated PAL blocks "2" and "3" and "4" in the same (or similar) manner. The census tract 1325 may be divided in a similar manner to census tract 1305, but the allocation of PAL blocks "2" and "3" and "4" may be different than the allocation used for census tract 1305. In the example scenario 1340, the outer edge of census tract 1345 may be divided to include two portions. One portion 1346 may be allocated the PAL block labeled as "2" and the shaded portion 1348 may be allocated a different PAL block (which may be "3" or "4" or a different PAL block, such as "5").

Figure 14:
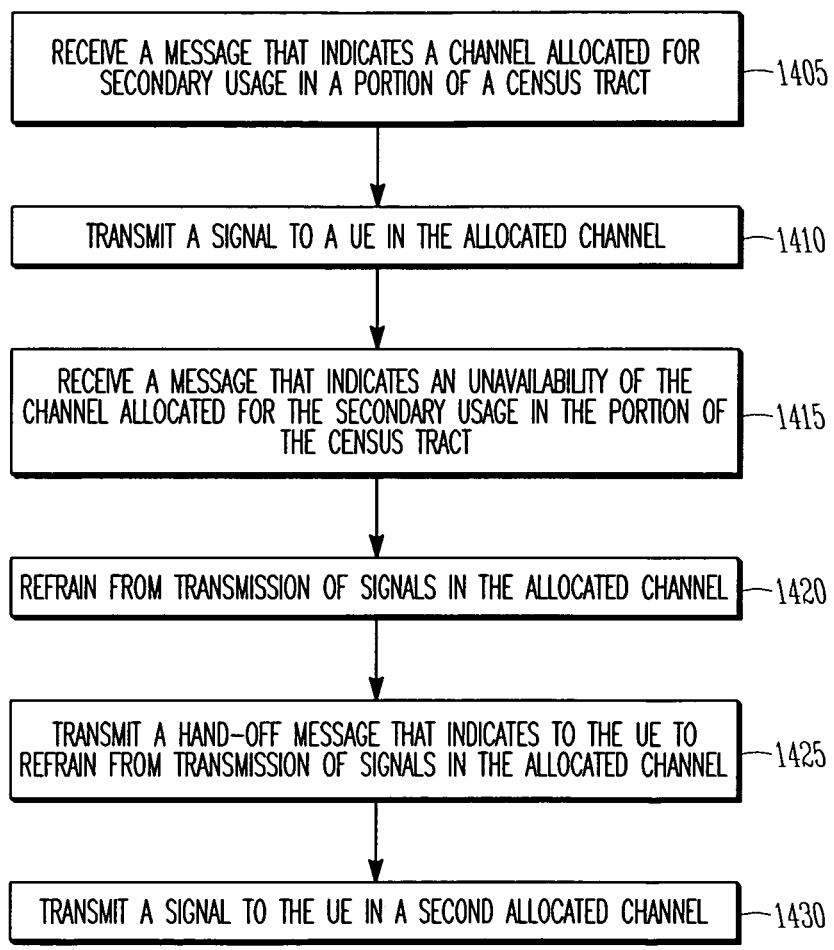
FIG. 14 illustrates the operation of a method of communication in accordance with some embodiments.

FIG. 14 illustrates the operation of another method of allocation of shared spectrum in accordance with some embodiments. As mentioned previously regarding the method 800, embodiments of the method 1400 may include additional or even fewer operations or processes in comparison to what is illustrated in FIG. 14 and embodiments of the method 1400 are not necessarily limited to the chronological order that is shown in FIG. 14. In describing the method 1400, reference may be made to FIGS. 1-13, although it is understood that the method 1400 may be practiced with any other suitable systems, interfaces and components. In addition, embodiments of the method 1400 may refer to eNBs 104, UEs 102, APs, STAs, CBSDs, SAS controllers, or other wireless or mobile devices, although embodiments are not limited to those devices. Although the method 1400 may be described for an eNB 560, it is understood that other base station components and/or CBSDs may be used in some embodiments. The method 1400 may also refer to an apparatus for an eNB 560, UE 555, SAS controller 570 and/or other device described above.

It should be noted that the method 1400 may be practiced at an eNB 560, and may include exchanging of signals or messages with a SAS controller 570. Similarly, the method 800 may be practiced at a SAS controller 570, and may include exchanging of signals or messages with an eNB 560. In some cases, operations and techniques described as part of the method 800 may be relevant to the method 1400. In addition, embodiments may include operations performed at the SAS controller 570 that are reciprocal or similar to other operations described herein performed at the eNB 560. For instance, an operation of the method 1400 may include reception of a message by the eNB 560 while an operation of the method 800 may include transmission of the same message or similar message by the SAS controller 570.

In addition, previous discussion of various techniques and concepts may be applicable to the method 1400 in some cases, including the primary and secondary usage of the shared spectrum, allocation of the shared spectrum, retaking of the shared spectrum for primary usage, the SAS controller 570, interference measurements, spectrum sensing information, availability and/or unavailability of the shared spectrum, cells, census tracts, fractional frequency reuse (FFR), and others.

At operation 1405, the eNB 560 may receive a message, such as a configuration message and/or other message, which may indicate one or more channels of shared spectrum that are allocated to the eNB 560 for secondary usage. The secondary usage may be related to a census tract and/or a portion of the census tract. For instance, FFR techniques may be used to allocate a channel in an interior portion or an exterior portion of a census tract. The secondary usage may include usage in accordance with PAL usage, in some cases.

At operation 1410, the eNB 560 may transmit one or more signals to a UE 555 in the allocated channel(s). The eNB 560 may also receive one or more signals from the UE 555 in the allocated channel(s). As an example, data signals, control signals and/or other signals may be exchanged between the eNB 560 and the UE 555. In some cases, the eNB 560 may exchange messages with multiple UEs 555 in the allocated channel(s). In some embodiments, the signals may be transmitted in accordance with transmit power limits and/or other guidelines. Although embodiments are not limited as such, the limits may be predefined, preconfigured and/or communicated by the SAS controller 570, in some cases.

At operation 1415, the eNB 560 may receive a message that indicates an unavailability of one or more channels, which may include channels allocated to the eNB 560 for the secondary usage. In some cases, such messages may indicate other channels for hand-off of communication between the eNB 560 and UEs 555. At operation 1420, the eNB 570 may refrain from transmission of signals in the channels that are indicated as unavailable. At operation 1425, the eNB 570 may transmit one or more hand-off messages and/or other messages that may indicate to the UE 555 to refrain from transmission in the channels that are indicated as unavailable. Such messages may also indicate other channels to which communication between the eNB 560 and the UE 555 may be handed off, in some cases. At operation 1430, the eNB 570 may transmit one or more signals to one or more UEs 555 in channels to which the communication between the eNB 560 and the UE 555 is handed off.

In Example 1, an apparatus for an Evolved Node-B (eNB) may comprise hardware processing circuitry, interface circuitry, and transceiver circuitry. The hardware processing circuitry may configure the interface circuitry to receive, from a spectrum sharing controller, a message that indicates a channel allocated for secondary usage by eNBs operating in a portion of a shared spectrum usage area. The hardware processing circuitry may configure the transceiver circuitry to transmit a signal to a User Equipment (UE) in the allocated channel. The eNB may be configured to operate in accordance with a Priority Access License (PAL) usage in the portion of the shared spectrum usage area. The channels may be included in shared spectrum reserved for primary usage by one or more incumbent devices.

In Example 2, the subject matter of Example 1, wherein the channel may be allocated for the secondary usage in an interior portion of the shared spectrum usage area that is surrounded by one or more exterior portions of the shared spectrum usage area.

In Example 3, the subject matter of one or any combination of Examples 1-2, wherein secondary usage of the channel in the exterior portions of the shared spectrum usage area may be restricted as part of the allocation of the channel for the secondary usage in the interior portion.

In Example 4, the subject matter of one or any combination of Examples 1-3, wherein the secondary usage of the channel in the interior portion and the restriction of the secondary usage in the exterior portion may be in accordance with a fractional frequency reuse (FFR) arrangement.

In Example 5, the subject matter of one or any combination of Examples 1-4, wherein the channel may be allocated for the secondary usage in an exterior portion of the shared spectrum usage area that surrounds at least one interior portion of the shared spectrum usage area.

In Example 6, the subject matter of one or any combination of Examples 1-5, wherein the message may be a first message. The hardware processing circuitry may further configure the interface circuitry to receive, from the spectrum sharing controller, a second message that indicates an unavailability of the channel for the secondary usage in the portion of the shared spectrum usage area. The hardware processing circuitry may further configure the transceiver circuitry to refrain from transmission of signals in the allocated channel.

In Example 7, the subject matter of one or any combination of Examples 1-6, wherein the allocated channel may be a first channel and the second message may further indicate a second channel in the shared spectrum that is available for the secondary usage. The hardware processing circuitry may further configure the transceiver circuitry to transmit, to the UE, a hand-off message that indicates the second channel and further indicates that the UE is to refrain from usage of the first channel.

In Example 8, the subject matter of one or any combination of Examples 1-7, wherein the message may further indicate a transmit power limit for the operation in accordance with the PAL usage.

In Example 9, an apparatus of a spectrum sharing controller may comprise hardware processing circuitry and interface circuitry. The hardware processing circuitry may configure the interface circuitry to receive an indicator that a group of channels are available for secondary usage in a shared spectrum usage area. The channels may be included in shared spectrum reserved for primary usage in the shared spectrum usage area by one or more incumbent devices. The hardware processing may further configure the interface circuitry to send a configuration message that allocates a channel in the group for secondary usage, by an Evolved Node-B (eNB), in a portion of the shared spectrum usage area.

In Example 10, the subject matter of Example 9, wherein the channel may be allocated for secondary usage in an interior portion of the shared spectrum usage area that is surrounded by one or more exterior portions of the shared spectrum usage area.

In Example 11, the subject matter of one or any combination of Examples 9-10, wherein secondary usage of the channel in the exterior portions of the shared spectrum usage area may be restricted as part of the allocation of the channel for the secondary usage in the interior portion.

In Example 12, the subject matter of one or any combination of Examples 9-11, wherein the configuration message may be a first configuration message, the channel allocated by the first configuration message may be a first channel, and the eNB may be a first eNB. The hardware processing circuitry may further configure the interface circuitry to send a second configuration message that allocates a second channel in the group for secondary usage, by a second eNB, in an exterior portion of the shared spectrum usage area.

In Example 13, the subject matter of one or any combination of Examples 9-12, wherein the hardware processing circuitry may be configured to determine the second channel based on an adjacent channel interference metric between the second channel and the first channel.

In Example 14, the subject matter of one or any combination of Examples 9-13, wherein the hardware processing circuitry may include baseband circuitry to determine the second channel.

In Example 15, the subject matter of one or any combination of Examples 9-14, wherein the hardware processing circuitry may further configure the interface circuitry to receive an indicator that the first channel is unavailable for the secondary usage by the first eNB in the interior portion of the shared spectrum usage area. The hardware processing circuitry may be configured to determine a third channel in the group to be allocated for the secondary usage by the first eNB in the interior portion of the shared spectrum usage area. The determination of the third channel may be based at least partly on an adjacent channel interference metric between the second channel and the third channel.

In Example 16, the subject matter of one or any combination of Examples 9-15, wherein the unavailability of the first channel may be based at least partly on intended operation, by the incumbent device, in a portion of the shared spectrum that includes the first channel.

In Example 17, the subject matter of one or any combination of Examples 9-16, wherein the secondary usage by the first eNB and the secondary usage by the second eNB may be in accordance with Priority Access License (PAL) usage.

In Example 18, the subject matter of one or any combination of Examples 9-17, wherein the first and second channels may be allocated to the interior and exterior portions in accordance with a fractional frequency reuse (FFR) arrangement.

In Example 19, the subject matter of one or any combination of Examples 9-18, wherein the configuration message may be a first configuration message, the eNB may be a first eNB, and the shared spectrum usage area may be a first shared spectrum usage area. The hardware processing circuitry may further configure the interface circuitry to send a second configuration message that allocates the channel for secondary usage, by a second eNB, in a portion of a second shared spectrum usage area.

In Example 20, the subject matter of one or any combination of Examples 9-19, wherein the second shared spectrum usage area may be geographically exclusive to the first shared spectrum usage area. The channel may be allocated for the secondary usage in the second shared spectrum usage area based at least partly on a co-channel interference metric between the first shared spectrum usage area and the second shared spectrum usage area.

In Example 21, the subject matter of one or any combination of Examples 9-20, wherein the portion of the second shared spectrum usage area may include an exterior portion of the second shared spectrum usage area that is adjacent to at least one of the exterior portions of the first shared spectrum usage area.

In Example 22, the subject matter of one or any combination of Examples 9-21, wherein the hardware processing circuitry may configure the interface circuitry to receive an indicator that the channel allocated for secondary usage by the eNB in a portion of the shared spectrum usage area is unavailable. The hardware processing circuitry may be configured to determine a second channel in the group to be allocated for the secondary usage by the eNB in the portion of the shared spectrum usage area. The determination of the second channel may be based at least partly on an adjacent channel interference metric between the first channel and the second channel.

In Example 23, the subject matter of one or any combination of Examples 9-22, wherein the configuration message may be a first configuration message. The secondary usage by the eNB may be in accordance with Priority Access License (PAL) usage. The hardware processing circuitry may further configure the interface circuitry to send a second configuration message that allocates one or more other channels in the group for General Authorized Access (GAA) usage by other eNBs in an exterior portion of the shared spectrum usage area.

In Example 24, the subject matter of one or any combination of Examples 9-23, wherein the spectrum sharing controller may be configured to operate as a Spectrum Access System (SAS) controller. The shared spectrum usage area may include a census tract.

In Example 25, the subject matter of one or any combination of Examples 9-24, wherein the spectrum sharing controller may be configured to operate as a Licensed Shared Access (LSA) controller.

In Example 26, a non-transitory computer-readable storage medium may store instructions for execution by one or more processors to perform operations for allocation of shared spectrum by a Spectrum Access System (SAS) controller. The operations may configure the one or more processors to determine an allocation of shared spectrum for a group of census tracts for operation in the census tracts by one or more Priority Access License (PAL) devices. The shared spectrum may be reserved for priority usage by one or more incumbent devices. The operations may further configured the one or more processors to configure the SAS controller to send one or more configuration messages to the PAL devices to indicate the allocation. The allocation of the shared spectrum may be based on a fractional frequency reuse (FFR) arrangement in which at least some of the census tracts are divided into interior portions and exterior portions. Channels of the shared spectrum may be allocated for usage in the interior portions and exterior portions based on one or more interference metrics for the census tracts.

In Example 27, the subject matter of Example 26, wherein the interference metrics may include a co-channel interference metric between two or more census tracts and/or an adjacent channel interference metric between two or more channels of the shared spectrum.

In Example 28, the subject matter of one or any combination of Examples 26-27, wherein for at least one pair of adjacent census tracts, a same channel may be allocated to the interior portions of the pair of adjacent census tracts and the channels allocated for usage in the exterior portions of the pair of adjacent census tracts may be exclusive.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an Evolved Node-B (eNB), the apparatus comprising hardware processing circuitry, interface circuitry, and transceiver circuitry, the hardware processing circuitry to:
   configure the interface circuitry to receive, from a spectrum sharing controller, a message that indicates a channel allocated for secondary usage by eNBs operating in a portion of a shared spectrum usage area and to receive in the message or another message an indication of another channel allocated for secondary usage by the eNBs operating in another portion of the shared spectrum usage area;
   configure the transceiver circuitry to transmit a signal to a User Equipment (UE) in the allocated channel,
   wherein the eNB is configured to operate in accordance with a Priority Access License (PAL) usage in the portion of the shared spectrum usage area,
   wherein the channel is included in shared spectrum reserved for primary usage by one or more incumbent devices, one of the channel and the other channel allocated for secondary usage in an interior region and the other one of the channel and the other channel allocated in an exterior region that surrounds the interior region, wherein the hardware processing circuitry is configured to determine the other channel based on an adjacent channel interference metric between the channel and the other channel.

2. The apparatus according to claim 1, wherein the channel is allocated for the secondary usage in an interior portion of the shared spectrum usage area that is surrounded by one or more exterior portions of the shared spectrum usage area.

3. The apparatus according to claim 2, wherein secondary usage of the channel in the exterior portions of the shared spectrum usage area is restricted as part of the allocation of the channel for the secondary usage in the interior portion.

4. The apparatus according to claim 3, wherein the secondary usage of the channel in the interior portion and the restriction of the secondary usage in the exterior portion are in accordance with a fractional frequency reuse (FFR) arrangement.

5. The apparatus according to claim 1, wherein the channel is allocated for the secondary usage in an exterior portion of the shared spectrum usage area that surrounds at least one interior portion of the shared spectrum usage area.

6. The apparatus according to claim 1, wherein:
   the message is a first message,
   the hardware processing circuitry is to further configure the interface circuitry to receive, from the spectrum sharing controller, a second message that indicates an unavailability of the channel for the secondary usage in the portion of the shared spectrum usage area,
   the hardware processing circuitry is to further configure the transceiver circuitry to refrain from transmission of signals in the allocated channel.

7. The apparatus according to claim 6, wherein:
   the allocated channel is a first channel,
   the second message further indicates a second channel in the shared spectrum that is available for the secondary usage, and
   the hardware processing circuitry is to further configure the transceiver circuitry to transmit, to the UE, a hand-off message that indicates the second channel and further indicates that the UE is to refrain from usage of the first channel.

8. The apparatus according to claim 1, wherein the message further indicates a transmit power limit for the operation in accordance with the PAL usage.

9. An apparatus of a spectrum sharing controller, the apparatus comprising hardware processing circuitry and interface circuitry, the hardware processing circuitry to configure the interface circuitry to:
   receive an indicator that a group of channels are available for secondary usage in a shared spectrum usage area, the channels included in shared spectrum reserved for primary usage in the shared spectrum usage area by one or more incumbent devices;

send a first configuration message that allocates a first channel in the group for secondary usage, by a first Evolved Node-B (eNB), in a portion of the shared spectrum usage area, the first channel allocated for secondary usage in an interior portion of the shared spectrum usage area that is surrounded by one or more exterior portions of the shared spectrum usage area; and send a second configuration message that allocates a second channel in the group for secondary usage, by a second eNB, in an exterior portion of the shared spectrum usage area, wherein the hardware processing circuitry is configured to determine the second channel based on an adjacent channel interference metric between the second channel and the first channel.

10. The apparatus according to claim 9, wherein secondary usage of the first channel in the exterior portions of the shared spectrum usage area is restricted as part of the allocation of the channel for the secondary usage in the interior portion.

11. The apparatus according to claim 9, wherein the hardware processing circuitry includes baseband circuitry to determine the second channel.

12. The apparatus according to claim 9, wherein the secondary usage by the first eNB and the secondary usage by the second eNB are in accordance with Priority Access License (PAL) usage.

13. The apparatus according to claim 9, wherein the first and second channels are allocated to the interior and exterior portions in accordance with a fractional frequency reuse (FFR) arrangement.

14. The apparatus according to claim 9, wherein:
the shared spectrum usage area is a first shared spectrum usage area, and
the hardware processing circuitry is to further configure the interface circuitry to send a second configuration message that allocates the first channel for secondary usage, by a second eNB, in a portion of a second shared spectrum usage area.

15. The apparatus according to claim 9, wherein:
the secondary usage by the first eNB is in accordance with Priority Access License (PAL) usage,
the hardware processing circuitry is to further configure the interface circuitry to send a second configuration message that allocates one or more other channels in the group for General Authorized Access (GAA) usage by other eNBs in an exterior portion of the shared spectrum usage area.

16. The apparatus according to claim 9, wherein:
the spectrum sharing controller is configured to operate as a Spectrum Access System (SAS) controller, and
the shared spectrum usage area includes a census tract.

17. The apparatus according to claim 9, wherein the spectrum sharing controller is configured to operate as a Licensed Shared Access (LSA) controller.

18. An apparatus of a spectrum sharing controller, the apparatus comprising hardware processing circuitry and interface circuitry, the hardware processing circuitry to configure the interface circuitry to:
receive an indicator that a group of channels are available for secondary usage in a shared spectrum usage area, the channels included in shared spectrum reserved for primary usage in the shared spectrum usage area by one or more incumbent devices;
send a first configuration message that allocates a first channel in the group for secondary usage, by a first Evolved Node-B (eNB), in a portion of the shared spectrum usage area, the first channel allocated for secondary usage in an interior portion of the shared spectrum usage area that is surrounded by one or more exterior portions of the shared spectrum usage area; and
send a second configuration message that allocates a second channel in the group for secondary usage, by a second eNB, in an exterior portion of the shared spectrum usage area;
receive an indicator that the first channel is unavailable for the secondary usage by the first eNB in the interior portion of the shared spectrum usage area;
determine a third channel in the group to be allocated for the secondary usage by the first eNB in the interior portion of the shared spectrum usage area, the determination of the third channel based at least partly on an adjacent channel interference metric between the second channel and the third channel.

19. The apparatus according to claim 18, wherein the unavailability of the first channel is based at least partly on intended operation, by the incumbent device, in a portion of the shared spectrum that includes the first channel.

20. An apparatus of a spectrum sharing controller, the apparatus comprising hardware processing circuitry and interface circuitry, the hardware processing circuitry to configure the interface circuitry to:
receive an indicator that a group of channels are available for secondary usage in a first shared spectrum usage area, the channels included in shared spectrum reserved for primary usage in the shared spectrum usage area by one or more incumbent devices;
send a first configuration message that allocates a first channel in the group for secondary usage, by a first Evolved Node-B (eNB), in a portion of the shared spectrum usage area, the first channel allocated for secondary usage in an interior portion of the shared spectrum usage area that is surrounded by one or more exterior portions of the shared spectrum usage area;
send a second configuration message that allocates the first channel for secondary usage, by a second eNB, in a portion of a second shared spectrum usage area, wherein the second shared spectrum usage area is geographically exclusive to the first shared spectrum usage area, and the first channel is allocated for the secondary usage in the second shared spectrum usage area based at least partly on a co-channel interference metric between the first shared spectrum usage area and the second shared spectrum usage area.

21. The apparatus according to claim 20, wherein the portion of the second shared spectrum usage area includes an exterior portion of the second shared spectrum usage area that is adjacent to at least one of the exterior portions of the first shared spectrum usage area.

22. An apparatus of a spectrum sharing controller, the apparatus comprising hardware processing circuitry and interface circuitry, the hardware processing circuitry to configure the interface circuitry to:
receive an indicator that a group of channels are available for secondary usage in a shared spectrum usage area, the channels included in shared spectrum reserved for primary usage in the shared spectrum usage area by one or more incumbent devices;
send a configuration message that allocates a channel in the group for secondary usage, by an Evolved Node-B (eNB), in a portion of the shared spectrum usage area;

receive an indicator that the channel allocated for secondary usage by the eNB in a portion of the shared spectrum usage area is unavailable; and determine a second channel in the group to be allocated for the secondary usage by the eNB in the portion of the shared spectrum usage area, the determination of the second channel based at least partly on an adjacent channel interference metric between the first channel and the second channel.

23. A non-transitory computer-readable storage medium that stores instructions for execution by one or more processors to perform operations for allocation of shared spectrum by a Spectrum Access System (SAS) controller, the operations to configure the one or more processors to:

determine an allocation of shared spectrum for a group of census tracts for operation in the census tracts by one or more Priority Access License (PAL) devices, the shared spectrum reserved for priority usage by one or more incumbent devices;

configure the SAS controller to send one or more configuration messages to the PAL devices to indicate the allocation, wherein the allocation of the shared spectrum is based on a fractional frequency reuse (FFR) arrangement in which at least some of the census tracts are divided into interior portions and exterior portions, and wherein channels of the shared spectrum are allocated for usage in the interior portions and exterior portions based on one or more interference metrics for the census tracts.

24. The non-transitory computer-readable storage medium according to claim 23, wherein the interference metrics include a co-channel interference metric between two or more census tracts and/or an adjacent channel interference metric between two or more channels of the shared spectrum.

25. The non-transitory computer-readable storage medium according to claim 23, wherein for at least one pair of adjacent census tracts:

a same channel is allocated to the interior portions of the pair of adjacent census tracts, and the channels allocated for usage in the exterior portions of the pair of adjacent census tracts are exclusive.

* * * * *